US006424917B1

United States Patent
Kalkstein et al.

(10) Patent No.: US 6,424,917 B1
(45) Date of Patent: Jul. 23, 2002

(54) WEATHER TYPING SYSTEM AND METHOD WITH SPATIAL SYNOPTIC CLASSIFICATION BY SLIDING SEED DAYS

(75) Inventors: Lawrence S. Kalkstein, Newark, DE (US); Scott C. Sheridan, Abington, MD (US)

(73) Assignee: Surveillance Data Inc., Plymouth Meeting, PA (US)

( * ) Notice: Subject to any disclaimer, the term of this patent is extended or adjusted under 35 U.S.C. 154(b) by 0 days.

(21) Appl. No.: 09/500,041

(22) Filed: Feb. 8, 2000

(51) Int. Cl.[7] .............................................. G06F 169/00
(52) U.S. Cl. ........................................................ 702/3
(58) Field of Search .......................... 702/3, 4; 706/931; 342/26

(56) References Cited

PUBLICATIONS

Ye, H. et al., The Detection of Climate Change in the Arctic: An Updated Report, Atmospheric Research, 37 (1995), , pp. 163–173.

Kalkstein, Lawrence et al., "Detection of Climatic Change in the Western North American Arctic Using a Synoptic Climatological Approach," Journal of Climate, vol. 3, No. Oct. 1990.

Greene, J. Scott et al., "Quantitative Analysis of Summer Air Masses in the Eastern United States and an Application to Human Mortality," Climate Research, vol. 7: 43–53, 1996.

Kalkstein, Lawrence et al. "An Evaluation of Climate/ Mortality Relationships in Large U.S. Cities and the Possible Impacts of a Climate Change," Environmental Health Perspectives, vol. 105, No. 1, Jan. 1997.

Kalkstein, Lawrence S. et al., "A New Spatial Synoptic Classification: Application to Air–Mass Analysis," International Journal of Climatology, vol. 16, 983–1004, 1996.

*Primary Examiner*—Donald E. McElheny, Jr.
(74) *Attorney, Agent, or Firm*—Blank Rome Comisky & McCauley LLP

(57) ABSTRACT

The spatial synoptic classification (SSC) is modified by taking seed days within sliding periods so that seed days are selected from the warmest and coldest periods of the year and two intermediate periods. Artificial seed days are produced to represent typical weather patterns on other days of the year. From the selected seed days and the artificial seed days, a classification technique is developed to categorize a weather type for any day. Once the seed days are selected for a weather station, those seed days can be used to select seed days for nearby weather stations.

10 Claims, 7 Drawing Sheets

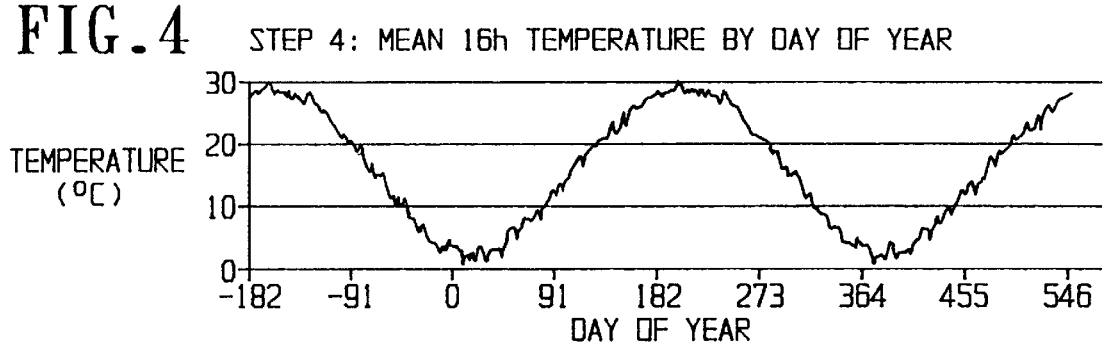
FIG. 4 STEP 4: MEAN 16h TEMPERATURE BY DAY OF YEAR
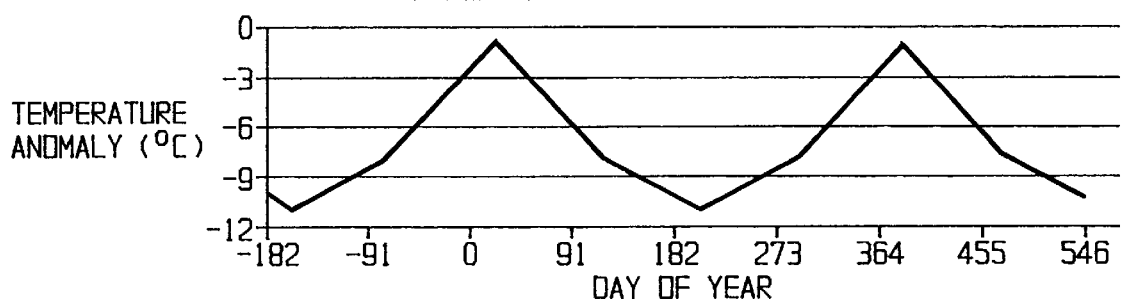
FIG. 5 STEP 5: MEAN 16h TEMPERATURE ANOMALY BY DAY, MP AIR MASS
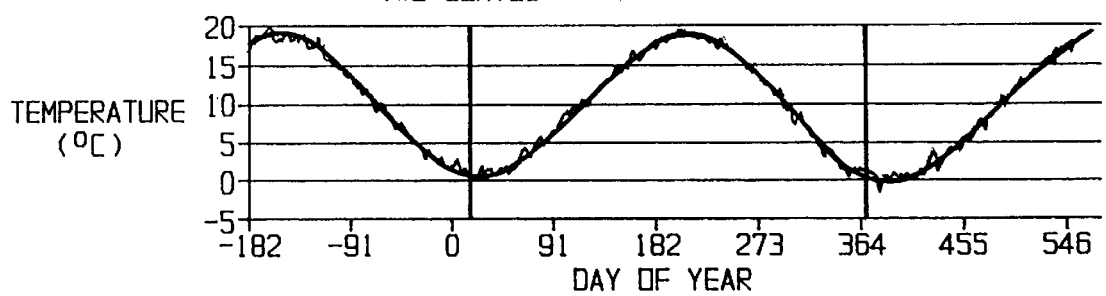
FIG. 6 STEP 6: FIT OF A POLYNOMIAL TO THE SUM OF THE TWO CURVES

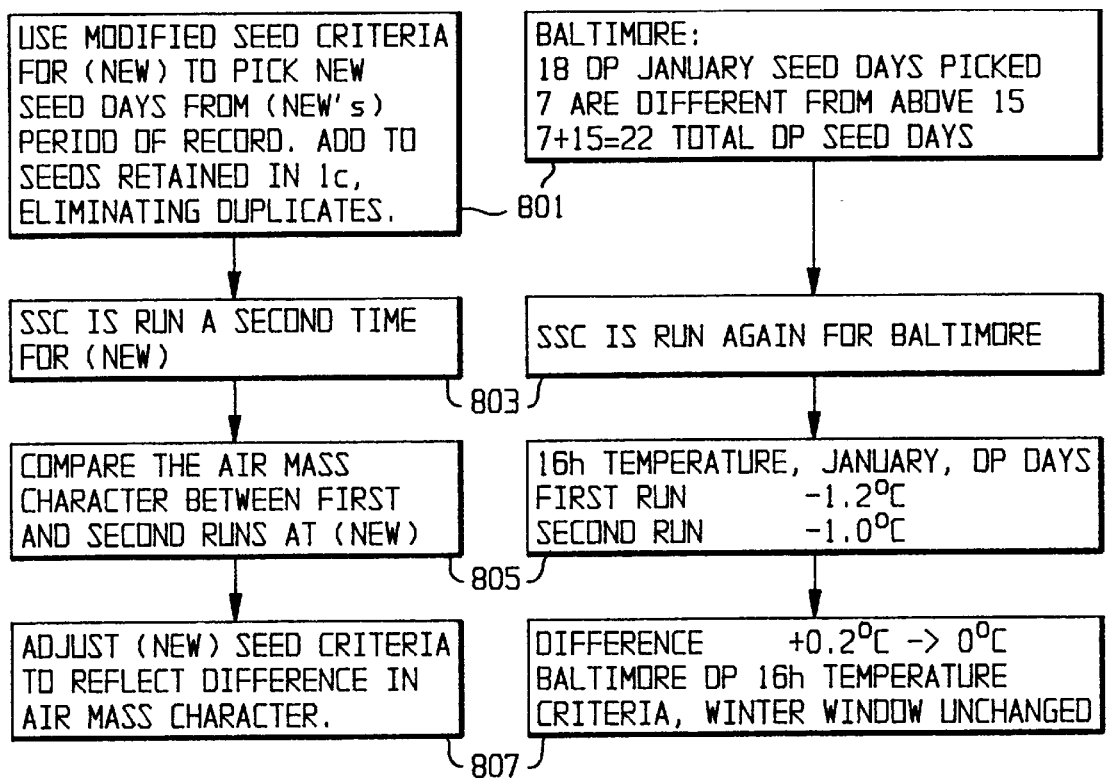
FIG. 8
FIG. 11A
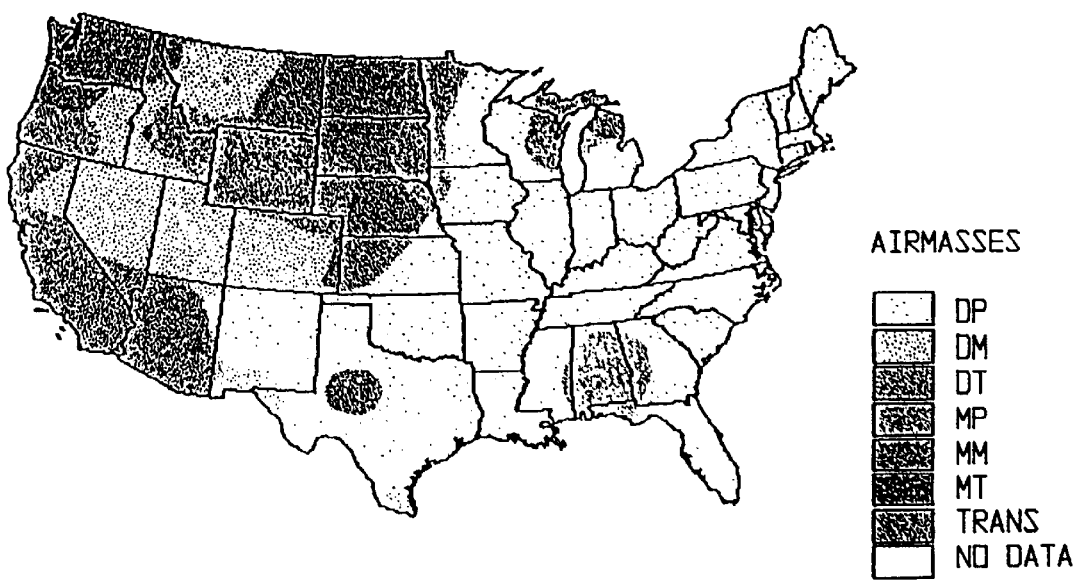

WEATHER TYPING SYSTEM AND METHOD WITH SPATIAL SYNOPTIC CLASSIFICATION BY SLIDING SEED DAYS

Two identical copies of a computer program listing appendix have been filed in conjunction with the present application and are hereby incorporated by reference in their entireties into the present disclosure. Each copy is on a CD-R medium compatible with an IBM PC running MS Windows. The computer program listing appendix includes the following files:

| Filename | Size in bytes | Creation date |
| --- | --- | --- |
| Allthere.f90 | 582 | Oct. 16, 2001 |
| Am2.f90 | 2,951 | Oct. 16, 2001 |
| Am3.f90 | 1,576 | Oct. 16, 2001 |
| Amcomp.f90 | 1,984 | Oct. 16, 2001 |
| Newcity.f90 | 3,569 | Oct. 16, 2001 |
| Oneam.f90 | 6,384 | Oct. 16, 2001 |
| Seedc2.f90 | 2,254 | Oct. 16, 2001 |
| Seedcomp.f90 | 2,332 | Oct. 16, 2001 |
| Seedpick.f90 | 5,316 | Oct. 16, 2001 |
| Ssc.f | 12,702 | Oct. 16, 2001 |

Both copies of the computer program listing appendix were created Oct. 16, 2001. The creation date of the files on the CD-R media reflects the date of creation of the media, not the date of origination of the programs listed in the files.

BACKGROUND OF THE INVENTION

The present invention relates to a system and method for classification of air masses and more specifically to an improvement to the spatial synoptic classification.

Synoptic weather-typing, or the classification of weather conditions or patterns into categories, is an endeavor which has been undertaken numerous times within the past century, with many different methodologies, techniques, goals, and results. The reasons for synoptic classification are twofold: It is a tool for improved understanding of the climate system, and it is useful for climate impact applications. It is largely for this second reason that synoptic weather-typing has flourished once again during the past two decades; increased concern over the impacts of weather, especially for the purpose of understanding possible implications of climate change, have driven the search for more, and better, weather-typing schemes.

Synoptic climatology has been defined as a deductive science which integrates the simultaneous atmospheric dynamics and coupled response of the surface environment. While the atmospheric dynamics and the surface environment are individually studied by atmospheric scientists and members of many other sciences, only in synoptic climatology are the relationships between the two the focus of study. The synoptic climatologist usually employs statistical rather than mathematical analysis; as a result, the researcher forsakes individual atmospheric dynamic effects for the holistic-effect of the atmosphere. Indeed, it is this aggregate of conditions with which the surface environment coexists and interacts.

Classification is a rudiment of synoptic climatology; modern classification schemes can be traced back to common origins in the early part of the 20th century. There are nearly as many ways of classifying classification schemes as there are schemes. For example, schemes have been subdivided on the basis of scale: local, regional, or global; or on the basis of methodology: objective, subjective, and multistage objective (which implies subjective decisions made amidst objective stages); or into subjective and automated (a more appropriate term than objective) methods. Some methods are circulation-to-environment, implying classification is done first and applied to environment later; these contrast with environment-to-circulation methods which account for environmental concerns in their classification methodology. Weather types (or air mass designations) are the goal of some schemes; map-pattern classifications of others.

Before the advent of high-speed computers, virtually all synoptic methods were subjective, or manual. Much early work, before the wide availability of upper air data, centered on air mass identification. An air mass is a contiguous and relatively homogeneous volume of air with respect to its thermal profile and moisture characteristics. Frontal theory, first promoted by the "Bergen school" of meteorologists after the end of World War I, led to the first widely used, and best-known air mass identification system. Four main air masses affecting the middle latitudes were identified: continental polar (cP), continental tropical (cT), maritime polar (mP), and maritime tropical (mT). These airmass monikers, with various modifications and refinements, have appeared in introductory meteorological textbooks to this day.

Manual techniques have gone far beyond these simple theoretical designations. The Muller Classification developed a system which has proven useful for a variety of applications, from insect populations to air quality. That system, set up for New Orleans, La., but easily extrapolated to much of the Gulf Coast, identifies eight distinct sea-level pressure and front patterns typically found in the region (e.g. "Continental High", "Gulf Return", "Tropical Cyclone"). Updates are continually performed, and the calendar is complete from 1951.

The Lamb Catalogue is another famous weather-typing scheme, designed for sea-level pressure patterns over the United Kingdom, but as with Muller's system, transferable elsewhere. The system contains 27 different classifications, combinations of the direction of wind flow (eight cardinal points and unclassifiable) and curvature of wind flow (cyclonic, anticyclonic, or neither). The system has been used for numerous applications, including temperature forecasting and rainfall acidity.

Developed for Central Europe, Grosswetterlagen differs from the above two systems in that it examines several-day-long patterns first and then divides them into individual days. The four main categories are zonal, meridional, mixed, and unclassified. Twenty-nine subcategories are defined by further classifying the main categories according to anticyclonic, cyclonic, directional, and strength of flow considerations. Both Grosswetterlagen and the Lamb Catalogue have been retroactively created through the 19th century.

Subjective schemes such as these have several benefits. The investigator is in full control of the process and classification, which can be performed without access to significant computer resources. The classification system can thus be tailored precisely to the researcher's needs. Unfortunately, these main attractions of manual classifications are also their drawbacks. These schemes can be difficult to export to other locations, and are also quite time consuming. Subjectivity can become excessive: different researchers will not necessarily agree on classifications for a given day; thus these schemes are not replicable.

The computer revolution of recent decades has resulted in the development of many more synoptic classification methods, especially automated ones. One such method is called correlation-based map patterns. The ultimate product is similar to Muller's, but the human decision is replaced by an automatic grouping based on similarity of (usually) sea-level pressure patterns in the region of interest. Correlation coefficients are computed between all map pairs, comparing pressure values at corresponding grid points. The first key day is the map with the highest average correlation with other maps. Maps above a certain threshold of correlation with the key day are then grouped and removed from the pool. The process then iterates; maps can later migrate to other groups if their correlation is higher with a newly selected key day. Much care must be taken in defining the several necessary parameters, namely the minimum correlation threshold and the number of categories desired. This method, unlike the manual method, assures the reproducibility of classification, and has been used for a variety of research. Of course, this method can easily produce categories which do not conform to investigator needs. Within-category variability can often be significant and reduce potential benefit from the system, and slight changes in input thresholds can result in significantly different results.

Another very common group of synoptic classification methods in recent times is eigenvector-based. Typically this involves two steps: a "reduction of variables" and clustering of those reduced variables. Representative of this method is the Temporal Synoptic Index (TSI). The TSI begins with a reduction of variables via principal components analysis (PCA). PCA transforms the original variables into new variables, each of which is orthogonal to all others. Orthogonal variables by definition have no collinearity between variables [cov (x,y)=0], eliminating a common feature of many meteorological datasets. Each transformed variable has an associated eigenvalue, a representation of the total variance of the original variables it explains. A small subset of transformed variables can then be chosen (in the case of the TSI, those with eigenvalue>1) to explain the majority of the original variability, reduce the number of calculations and effects of collinearity.

Once the data are "reduced", a cluster analysis (CA) of daily transformed variable values is performed. TSI originally employed Ward's algorithm, although many similar methods are available. These methods generally have thresholds which limit dissimilarity between groups (in the case of Ward's algorithm, by minimizing the sum of squares between a particular day and the group mean). The user must manually limit clusters to a number which theoretically represents a relative maximum of among-group variance to within-group variance, but in practice represents an approximation of the number of groups expected or desired.

The TSI and fellow PCA/CA methods have been used to assess a large number of problems. from heat-stress related mortality to interpolation of missing values in a data set. These methods are commonly applied for their ease of use, reproducibility, and general ease of interpretation of results. The main drawback to this system is the lack of comparability between stations. Most of these methods are applied to only one station (or, in some cases one region) at a time, and comparison of results from station to station is not feasible, as each station may have a different number of clusters representing different conglomerations. One solution has been to turn the time dimension into space to perform a spatial cluster analysis. While results on some days were favorable, on others spatial patterns were irregular, and the need of redoing the entire procedure for each day reduced its practicality.

Having reviewed the benefits and advantages of both manual and automated methods, it seems intuitive that a valuable synoptic methodology could be derived by combining the two methods into a hybrid scheme. Attempts at hybrid schemes have been undertaken by relatively few researchers. One such scheme classifies air masses over the north central United States. Initial development is subjective: six air masses are identified, and 85-kPa temperatures and dew points for each air mass are taken from days when the air mass is clearly known by virtue of trajectory. Normal curves are then derived for each air mass based on the partial collectives technique, which assumes the overall frequency distribution of a given parameter is comprised of several superimposed normal curves. This automated segment then produces limits of parameter values for each air mass for each station-month. In order to prevent borderline days from being misclassified, a "transition zone" is used as a buffer between air masses.

Another hybrid procedure produces map classifications. That procedure initially classifies 12 years of daily sea-level pressure maps for the eastern US into ten distinct classifications and an unclassifiable group. A mean pressure field is calculated for each of the classifications. The mean fields then serve as keydays in the correlation-based method outlined above; the most subjective segment of the keyday procedure the number of keydays, is not an issue as the number of groups is already chosen. A correlation based threshold is then used to assign all days into one map type. Results show that on fewer than half of the days do the manual and hybrid procedures match, and while aggregated group comparisons show consistency, in smaller groups of data the disparity between manual and hybrid becomes readily apparent.

The first version of the Spatial Synoptic Classification (SSC1) system is a hybrid system which is redeveloped for use in this research. A full description of its original manifestation along with modifications for the present invention will be set forth below.

Some meteorological concepts will now be introduced.

Teleconnections are the linkages over large distances of what intuitively seem to be disconnected weather anomalies. Some teleconnections are observed as sea-level pressure anomalies, which have a direct effect on low-level wind and other surface meteorological conditions. Others are more appropriately assessed by geopotential height patterns above the surface (usually at 50 or 70 kPa); these patterns (which, by geostrophic theory, approximate wind flow patterns) are the steering mechanism for the atmosphere, differentially advecting air masses into different regions. A solid connection therefore exists between surface meteorological conditions and height patterns, although the relationship is variable through time and space.

Many teleconnection studies relate climate anomalies to various "seesaw" mechanisms, or weather cycles, throughout the world. One of the most potent, and after the event of 1997–98, the most well-known, is El Niño—Southern Oscillation (ENSO). There are many more possible climate controls, however, from the Quasi-Biennial Oscillation (100 yr) to the Luni-Solar cycle (101 yr), and orbital (Milankovich) parameter oscillations (102–104 yr).

Climate variability is a topic of critical interest to many contemporary researchers, who are trying to distinguish "natural" variability from that which is suggestive of human involvement. While scientific certainty is lacking in the overall debate on human-induced climate change, it is well established that a fair amount of the variability in the climate can be explained by weather cycles. For example, it has been shown that 72 percent of Northern Hemisphere January temperature variability can be accounted for by the variations in six teleconnective indices.

The El Niño—Southern Oscillation (ENSO) phenomenon is comprised of two synchronous (and synergistic) components—the oceanic (El Niñ) and the atmospheric (Southern Oscillation). Both components have been known to exist since the early part of the 20th century; it was not until much later that their connection was realized. The term "El Niño" originally designated the cessation of local up welling (and inherent sea surface temperature rise) associated with a weak westerly current along the Peruvian and Ecuadorian coastline, regularly observed near Christmas time (hence El Niñ, "The Christ Child"). Irregularly every 2 to 10 yr, this warming is particularly strong, and over the course of subsequent months anomalously high sea-surface temperatures (1 to 5° C. above average) and a deepened thermocline intensify and spread westward to the International Date Line, and along American coasts from Mexico to Southern Peru. Events are by no means regular or typical; although in general, peak warming occurs near the following Christmas, after which it dissipates. While many definitions exist, it is this entire warming event which is generally labeled El Niño.

The Southern Oscillation is the atmospheric companion to El Niño. It involves a redistribution of atmospheric mass above the Pacific Basin, and a disruption of the Walker Circulation. The Walker Circulation is the east-west atmospheric circulation above the equatorial Pacific, driven by large-scale sea surface temperature (SST) anomalies. The eastern edge of this circulation is the South American Pacific coast, where upwelling results in cooler ocean temperatures;. the western edge is near Indonesia, where SSTs are among the highest in the world. The convection in this region resulting from the high SSTs causes lower pressure west, and higher pressure east. Through the pressure gradient force, these pressure anomalies produce low-level easterly winds, which rise over the Western Pacific, return west, and sink over the Eastern Pacific.

This "typical" pattern generally breaks down during an El Niño event. The aforementioned SST anomalies decrease (or even reverse) the temperature gradient, disrupt the Walker circulation, and shift the center of convection from Indonesia to the Central Equatorial Pacific. Many subsequent teleconnections are set in motion; those related to North America are discussed below.

This combination of t he above atmospheric and oceanic events is hereafter called a Warm Event. In addition, there are Cold Events, alternately known as La Niña or LNSO events. Cold Events have received less attention than Warm Events, since the east-west SST gradient and Walker Circulation are merely enhanced but do not change sign. Convection increases in the western Pacific and decreases in the central and eastern Pacific. In general, Cold Events occur somewhat less frequently than Warm Events, although it is common for a Cold Event to occur during the year following a strong Warm Event.

One or both of two common criteria are used to determine the occurrence of a Cold or Warm Event; an atmospheric response, and an oceanic response. The principal atmospheric index is the Southern Oscillation Index (SOI). The SOI, generally performed on monthly means, represents the standardized difference in sea-level pressure between Papeete, Tahiti, in the Central Pacific (17° S, 150° W), and Darwin, Northern Territory, on the northern coast of Australia (12° S, 131° E). During Warm Events, lower (higher) pressure at Tahiti (Darwin) results in a negative index; Cold Events are associated with a positive index value. An Event is usually said to be occurring when several (usually 6) consecutive months have SOI values above/below ±1.0.

Oceanic-based definitions of ENSO consist of SST anomalies from "average" conditions for a given region of the Pacific. Many different regions have been defined over time; the most recent "optimal" region is the Niño 3.4" region, which is a box between 5° N and 5° S, 1° W and 170° W. This region is the centered on the area of peak correlation coefficient between SST and SOI (c. −0.8).

A considerable amount of research has analyzed anomalies of temperature and precipitation in relation to ENSO events. Only a subset of those which have examined North America are examined here. As with anomalies associated with all teleconnections and weather cycles, it should be kept in mind that the anomalies are tendencies derived from many years' data, and other year-to-year variability can mask much of the signal in any given year.

While the exact dimensions of the anomaly vary according to researcher, the most significant Warm Event thermal anomalies are above-average temperatures across much of Alaska, western and central Canada, the northwestern US, and California, from December through May. Some additional studies extend this anomaly into the Great Lakes region, across all of southern Canada to Newfoundland, or contain a distinct secondary region over Quebec, the Atlantic. Provinces, and Maine. Another anomaly commonly discovered is of below average temperatures in the southeastern US from October to May. In some studies this is limited to the immediate Gulf Coast, while others include a wider region, as wide as a swath from New Mexico to Virginia, and south to Cuba. Summertime anomalies are less significant both in magnitude and reliability; however, cooler than average temperatures are noted in the US Rockies and northern US Plains.

Cold Event research has been undertaken by fewer researchers; however, most agree on a near exact reversal of the anomaly in Alaska, Canada, and the northwestern US, with colder than average temperatures during winter and spring. No southeastern US winter and spring thermal anomaly appears in Cold Events, although a cooler than average July to June is observed in the Caribbean.

Precipitation anomalies with ENSO are more commonly studied. The most established North American anomaly during Warm Events is a wetter Gulf Coast region, during the same time period and covering the same extent as the cold anomaly mentioned above. Not far to the north, some studies show a considerable region of drier than average conditions during the same winter/spring in the Great Lakes and Ohio River Valley. A wetter northern Great Plains and Great Basin 1986) during summer have been noted. Some research has shown California precipitation to be higher during Warm Event winters, although this relationship is tenuous and dependent upon specific Pacific SST anomaly patterns. Summer monsoon precipitation in Arizona and New Mexico shows spatial shifts between Warm Events and Cold Events; Warm Events tend to produce most positive anomalies over northern New Mexico, while Cold Events result in a wetter West Central Arizona. Lastly, during summer and autumn, anomalous westerly winds in the middle troposphere above the Atlantic inhibit tropical cyclone formation there; tropical-related precipitation is thereby reduced along the Atlantic and Gulf Coasts.

Cold Events tend to produce opposite anomalies for most locations, although the teleconnection response is clearly non-linear in others. While the magnitude is generally smaller; the year-to-year variability in Cold Event anomalies are less than the Warm Event anomalies. The most significant Cold Event anomalies are a drier Gulf Coast and wetter Ohio River Valley during winter.

In contrast to ENSO, the Pacific North American (PNA) teleconnection pattern is not a phenomenon in itself, but rather a derived index of mid-tropospheric circulation (either 50 or 70 kPa). It features several "centers of action": near Hawaii, the Aleutian Low, central Alberta, and the Florida Panhandle. These four centers are "teleconnected" in that a positive geopotential height anomaly near Hawaii tends to be associated with a positive anomaly near Alberta, and negative anomalies in the Aleutian Low and Florida Panhandle. One common definition of the PNA index is:

$$PNA=1/3[-Z^*(47.9° N, 170.0° W)+Z^*(49.0° N, 110.0° W)-Z^*(29.7° N, 86.3° W)],$$

where $Z^*$ signifies the standardized 70-kPa geopotential height anomaly. This index ignores the Hawaiian center, as do most formulations which are used to assess North American climate anomalies. Positive PNA values (+PNA, also known as "PNA") signify a more meridional flow over the North American continent. In winter, this generally means an amplification of the long-wave western North American ridge and eastern-North American trough which occur climatologically. Reverse PNA (−PNA, "RPNA") results in a more zonal flow over the continent, with a damping of the aforementioned ridge-trough system.

A PNA pattern has been shown to be the first principal component of Northern Hemispheric circulation in January, and a major component during all times of year except summer. A connection is often made between PNA and ENSO, partially due to an intensification of the Rossby wave train near the Hawaii "center" by increased SSTs during ENSO Warm Events. However, a typical "PNA response" has been observed in only half of Warm Event winters, and between 1947–1990, only 17 percent of SOI variability is explained by the PNA index.

The North Atlantic Oscillation (NAO) is similar to the PNA in that it is a Northern Hemispheric circulation index, and while it can be related to SST, it is primarily an atmospheric feature. Like the Southern Oscillation, the NAO represents a large-scale shift in atmospheric mass, and is generally observed via anomalies of sea-level pressure. The oscillation is between the two characteristic North Atlantic pressure centers: the Azores High, centered near the Azores (38° N, 26° W), and the Icelandic Low, centered between Greenland and Iceland (Lamb and Peppler 1987). The definition oft he NAO Index is usually the normalized difference in sea-level pressure between Ponta Delgada, Azores, and Akureyri, Iceland. A positive value of NAO (+NAO) signifies a stronger than average Icelandic Low and Azores High. Conversely, negative NAO values (−NAO) signify weaker than average pressure centers; with extreme negative NAO values, this can lead to a reversal of the typical pattern, with a weak high pressure center near Iceland.

The Quasi-Biennial Oscillation (QBO) is a well-documented reversal of winds in the stratosphere above the equator. Known since the 1950s, shifts (usually observed at 5 kPa) between the "West Phase" and "East Phase" occur with a periodicity averaging 28 mo, ranging between 21 and 33 mo. The West Phase plateaus at a maximum of near 10 m s$^{-1}$ for 10–20 mo, followed by a transition over several months to the East Phase. Easterly winds reach a stronger peak, near 20–25 m s$^{-1}$, yet persist for only 24 mo before a rapid transition back to West Phase. As the total cycle is slightly longer than 2 yr, there is no seasonality to the oscillation, although Kane (1992) notes a tendency for stronger accelerations between March and May.

The QBO in itself is not generally linked to climate anomalies, but rather modulates other teleconnections. The most important studies use the QBO to link the solar cycle with surface and lower tropospheric climate anomalies.

Two oft he oldest weather cycles explored are those related to the solar cycle and the luni-solar tide. Searches for their influence on climate date back two centuries, yet no widely-accepted explanation for the causal mechanisms of these cycles has ever been asserted. The luni-solar tide acts physically upon the Earth, causing slight acceleration and deceleration with a periodicity of 18.6 yr. The solar cycle is a manifestation of the 10–11 yr variation in sunspot activity, which alters the solar output by up to 0.1 percent.

While each individual weather cycle may have a large role in impacting climate, the synergy among the weather cycles can also be examined. One such study uses multiple linear regression to assess the effects of several teleconnection indices on meteorological conditions.

The vast majority of the studies focus on a surface response manifested in average temperature or total precipitation anomalies, often on a timescale of a month or longer. While valid and useful conclusions can be made from such parameters, they do not provide a full understanding of the effects of teleconnections or weather cycles. For example, the same "average" month can be comprised of a month of all days with near average temperature or a month filled with two weeks of well-above average temperature and two weeks of well below average temperature. Precipitation anomalies can be even more misleading, as point estimates, particularly during convective season, are poor estimators of a regional precipitation pattern.

Using a synoptic classification scheme to assess climate variability can provide more and different information. Responses can be expressed in terms of changing air mass or pressure pattern frequencies, which can be more enlightening in terms of large-scale precipitation anomalies, or for biometeorological or agricultural purposes. Relatively few studies have devoted much effort to an assessment of this sort.

The damage to agriculture caused by hard freezes in Florida has prompted research into the relationship between these freezes and teleconnections. This can be thought of as a synoptic assessment of climate variability where only one air mass or map pattern is examined.

While secular trends in climate data have not been reviewed above, much research into climate variability via synoptic methods has focused on secular trends, under the guise of climate change detection.

The Spatial Synoptic Classification (SSC) is one such weather-typing scheme, developed in the mid-1990's at the University of Delaware. The SSC is based on the identification of six different types of air masses across the North American continent, and at a station-by-station level, it assigns each day into one of those air masses, or a transition between types. It has been used for general climatological purpose as well as applications to pollution, health, and other weather phenomena. It is presently being adapted for use in heat watch warning systems at different locations throughout the world. For all its usefulness, however, the system does have several limitations, most notably its availability only during the winter and summer seasons.

The spatial synoptic classification, first generation (hereafter known as SSC1), is disclosed in L. S. Kalkstein et al, "A New Spatial Synoptic Classification: Application to Air-Mass Analysis," *International Journal of Climatology*, Vol. 16, pp. 983–1004 (1996), and in J. S. Greene et al, "Quantitative analysis of summer air masses in the eastern United States and an application to human mortality," *Climate Research*, Vol. 7, pp. 43–53 (1996), both of which are hereby incorporated by reference into the present disclosure. An overview of SSC1 will be provided with reference to FIGS. 1 and 2.

FIG. 1 shows the selection of seed days, which are days representing the typical meteorological character of each air mass at a location (locations typically being weather stations at airports). A determination of what types of synoptic events occur in the study area (step 101) and at that location (step 103), and of the meteorological character of each type of event (step 105), provide the knowledge of the synoptic events (step 107). Seed day selection criteria are developed, typically with reference to the selection criteria used at nearby locations (steps 109 and 111). The criteria are adjusted as needed (step 113), and in accordance with afternoon and diurnal meteorological observations, the seed days are selected (steps 115 and 117). It is then determined whether the selected seed days are acceptable, i.e., representative of the types of air masses under study (step 119). If not, the criteria are adjusted again (step 113).

Following the selection of acceptable seed days, discriminant function analysis is used to generated a linear function for each air mass from its group of seed days. The air masses are categorized as dry polar (DP), dry temperate (DM), dry tropical (DT), moist polar (MP), moist temperate (MM), and moist tropical (MT) (step 201). The seed days are selected as representing pure synoptic events (step 203) or transitions between synoptic events (step 205). Days other than seed days can then be classified as pure events (step 207) or transitional events (step 209). The resulting pure and transitional calendars are merged (step 211), and statistics are calculated for each type of synoptic event (step 213).

After analyzing many historical weather maps and climatologies, the developers of SSC1 decided that the traditional air mass lexicon mentioned in Chapter 2 (cP, cT, mP, mT) was too limited for application to the eastern half of the United States (the initial SSC classification region). In its place, six air mass types are defined:

1) Dry Polar (DP)
4) Moist Polar (MP)
2) Dry Moderate (DM)
5) Moist Moderate (MM)
3) Dry Tropical (DT)
6) Moist Tropical (MT)

Dry polar air is largely synonymous with the traditional cP air mass classification. It is characterized by cool or cold dry air, and for much of the continent, northerly winds. Skies typically feature little or no cloud cover. This air mass has its source in Northern Canada and Alaska, and is advected into the rest of North America by a cold-core anticyclone which emerges from the source region.

Dry Moderate or Dry Temperate air is mild and dry. This air mass has no traditional source region. In the eastern and central portions of North America, DM usually appears with zonal flow aloft, which permits air to traverse the Rocky Mountains, to dry and warm adiabatically. It is analogous to the Pacific air mass (Pa) identified by Schwartz (1991) and others. It can also be found over the southeastern US as polar air which has been brought back ashore after significant modification over the ocean. In the southwestern US desert areas where the character of the monsoon air mass does not reflect a true Moist Tropical air mass (see below), DM air can be identified (Sheridan 1997). In many cases, however, it merely reflects a significantly modified DP air mass or a mixture of Dry Tropical and Moist Tropical, or Dry Polar and Moist Tropical, influence.

Dry Tropical air is associated with the hottest and driest conditions, and clear skies. It is analogous to the traditional cT designation. It appears via two scenarios. Most commonly, it is present or advected (usually via surface anticyclone) from its source region, the deserts of the southwestern US and northwestern Mexico. It can also be produced by violent downsloping winds, where rapid compressional heating can produce desert-like conditions. The Chinook, common in the US and Canadian Rockies, and the Santa Ana winds of California, are two examples of this.

Moist Polar air is a large subset of the mP air mass. Weather conditions are cool, cloudy, and humid, often with light precipitation. This can appear via inland advection of air from the North Pacific or North Atlantic. It can also arise when there is frontal overrunning well to the south, or when a DP air mass acquires moisture while traversing a cool water body (the Great Lakes being the primary example).

Moist Moderate or Moist Temperate air is warmer and more humid than MP air, and also cloudy. This can form either as a modified mP air mass, or independently, south of MP air nearer a warm front. During summer, it can also occur under mT influence on days with high cloud cover (hence lowering the temperature).

Moist Tropical air is analogous to mT; it arrives in North America either via the Gulf of Mexico or tropical Pacific Ocean. It is found in the warm sector of a mid-latitude cyclone, and on the western side of a surface anticyclone. This air is warm and very humid, cloudy in winter and partly cloudy in summer. Convective precipitation is quite common in this air mass, especially in summer.

These six air masses, along with a transitional (TR) situation, which represents a day in which one air mass yields to another, were not altered during the SSC redevelopment. Quantification of the typical conditions of these air masses can be found in Chapter 4.

The foundation of the SSC rests upon the proper identification of the character of each air mass for a particular location. This is accomplished by the selection of Seed days. A seed day is an actual day in a station's period of record which represents the "typical" meteorological characteristics of a particular air mass at that location. "Extreme" days (e.g., the coldest DP days, most humid MT days) are avoided as they would bias the sample.

In order to obtain seed days, first these typical characteristics need to be quantified. Ranges of several different meteorological variables are-, specified, and a computer program extracts from a station's period of record all the days during a specified time of year which satisfy these criteria.

For the SSC1, seven different criteria were used in seed day identification:

afternoon (16 h EST) temperature.,
afternoon (16 h EST) dew point,
afternoon (16 h EST) cloud cover,
afternoon (16 h EST) wind direction,
afternoon (16 h EST) dew point depression,
diurnal temperature range (among values at 04, 10, 16, 22 h EST), and
six-hour dew point change (among same values).

After the seed day selection was complete, weather maps for the selected days were then analyzed to confirm that the days chosen did indeed represent the particular air mass for the given location. If the days were deemed to be non-representative, the seed day criteria would be adjusted and the procedure repeated.

Seed day criteria were specified individually for each station analyzed. As the spatial cohesiveness of the SSC is paramount, however, much effort was placed in assuring that neighboring stations have similar criteria for the same air mass, adjusting for local climatic factors. Different sets of seed criteria were selected for winter (December, January, and February) and summer (June, July, and August), and seeds were chosen from the period 1961–1990. At least 30 seed days represent each air mass in most locations, although rarely occurring air masses may by necessity yield fewer seed days.

In short, the SSC1 is a hybrid categorization system employing both manual and automated segments. The initial stage requires manual identification of air masses; once this is completed, an automated classification of days then occurs. The system was originally developed using discriminant function analysis for classification purposes.

Once seed days are selected, the next component of the SSC takes in the seed days and outputs an air mass category for every day in a station's period of record. The SSC1 utilized discriminant analysis for evaluation purposes (see Kalkstein et al. 1996 for a detailed description). Discriminant analysis is designed to measure the differences among multiple groups of objects (here, air masses) with respect to multiple variables simultaneously. The objective. is to assign new objects, to the predetermined groups using particular classification rules. The rules are the discriminant functions. Linear discriminant function analysis, used here, assumes multivariate normality, and equal covariance matrices within and among groups, although the procedure is still robust when these assumptions are relaxed (Klecka 1980).

Discriminant analysis uses, the covariance matrix and mean values of the variables to develop classification functions, to determine into which predetermined air mass category a particular new day belongs. A set of linear equations of the following form is developed:

$$h_k = b_{k0} + b_{k1} \times X_1 + b_{k2} \times X_2 + \ldots + b_{kp} \times X_p, \quad (1)$$

where h(k) is the value of the discriminant function for group (air mass) k, X is the value of each of the p variables (e.g., temperature), and b(kj) are modification coefficients based on the true group variability. These coefficients are determined by:

$$b_{ki} = (n_t - g) \times \sum_{j=1}^{p} a_{ij}^* \times X_{jk}, \quad (2)$$

where b(ki) is the coefficient for variable i in the equation corresponding to group k, X(jk) is the value of the variable, n(t) is the total number of cases over all g groups, and a(ij)* is an element from the inverse of the covariance matrix (A). A is defined by:

$$a_{ij} = \sum_{k=1}^{g} \sum_{m=1}^{n_t} (X_{ikm} - \overline{X}_{ik})(X_{ijm} - \overline{X}_{jk}), \quad (3)$$

where n(k) is the number of elements in group k, X(ik) is the mean value in the kth group, and X(ikm) is the value of variable i for case m in group k. The inverse oft he matrix is then computed to determine the a(ij)* values. The constant term in (1), b(k0), is defined as:

$$b_{k0} = -0.5 \times \sum_{j=1}^{p} b_{kj} \times X_{jk}. \quad (4)$$

A distinct discriminant function is calculated for each group and evaluated for each day. The day is, then classified into the group (air mass) with the highest score (highest h(k)).

Days on which a transition between one air mass and another occurs originally received an incorrect classification, as the system heretofore described only evaluates pure air masses. A second stage was therefore developed to account for this problem. Two new seed day groups were selected: one to represent pure air mass days, and the other to represent transitional days. Instead of the twelve variables from Table 1 below, only two variables were used: dew point change and sea level pressure change, both highly indicative of transitional situations. If both of these variables were twice the average, then it was designated a transition seed day. The second procedure is then run; a day which is classified as non-transitional keeps its original designation; one which is, becomes a Transition (TR) day.

TABLE 1

| | | |
|---|---|---|
| 04 h EST Temperature | 04 h EST Dew Point | Daily Cloud Cover |
| 10 h EST Temperature | 10 h EST Dew Point | Daily Sea Level Pressure |
| 16 h EST Temperature | 16 h EST Dew Point | Diurnal Temperature Range |
| 22 h EST Temperature | 22 h EST Dew Point | Diurnal Dew Point Range |

In its original form, the SSC1 possesses several limitations. As mentioned, the system was only developed for winter and summer. Selecting seed days with one set of criteria over an entire transitional season does not work. While the character of a typical DP day does not change significantly between December and February, from March to May, meteorological conditions undergo rapid change. Further, while air mass frequencies with SSC1 are spatially homogeneous, air mass "matches" (frequency of coincidence of air mass at neighboring stations) on a daily basis were less than expected. The seed day selection process was not streamlined to where a new station could easily be incorporated into the system. Entirely new seed day criteria (and hence seed days) would need to be assigned for each new station.

SUMMARY OF THE INVENTION

From the foregoing, it will be readily appreciated that a need exists in the art for a spatial synoptic classification which can accurately handle the transition seasons and which can handle multiple weather stations in a computationally efficient manner.

The first goal of the present invention is the redevelopment of the SSC. The redevelopment includes both sweeping changes to both the methodology and the implementation of the SSC for a much larger number of stations. The changes to the methodology render the system operations year-round, more capable of incorporating a new station, more easily understood, and with an increased cohesiveness among stations. In addition, it allows for a daily calendar to be construction and updated in real-time form. The implementation oft he system now extends its availability for 160 stations in the contiguous US, to 328 stations in all of the US and Canada. Character and frequency of all air masses at all stations have been assessed.

The second goal is to use the redeveloped SSC for two climate-related applications: as a distinct method of climate change assessment, and to help understand the local climatological impact of various teleconnections or weather cycles, of which El Niño is one example. To meet this second goal, the difference in the frequency and character of the six air masses among different phases of the weather cycles are assessed, along with the air mass frequency and character trends over time. The spatial continuity of any anomalies is determined, and the results should provide more insight into the effect of weather cycles and the understanding of secular trends than the mere precipitation of temperature anomalies usually ascribed.

To achieve the above and other goals, the spatial synoptic classification (SSC1) is modified to form a new spatial synoptic classification (SSC2) by taking seed days within sliding periods so that seed days are selected from the warmest and coldest periods of the year and two intermediate periods. Artificial seed days are produced to represent typical weather patterns on other days of the year. From the selected seed days and the artificial seed days, a classification technique is developed to categorize a weather type for any day. Once the seed days are selected for a weather station, those seed days can be used to select seed days for nearby weather stations.

BRIEF DESCRIPTION OF THE DRAWINGS

A preferred embodiment oft he present invention will be set forth in detail with reference to the drawings, in which:

FIGS. 1 and 2 are flow charts showing a known spatial synoptic classification;

FIGS. 3–6 show steps in the selection of seed days according to a preferred embodiment of the present invention;

FIG. 8 is a flow chart showing the selection of additional seed days in the nearby location;

FIG. 11A shows a map of air mass types for Jan. 18, 1977, made according to the preferred embodiment.

DETAILED DESCRIPTION OF THE PREFERRED EMBODIMENT

Figures 1, 3:
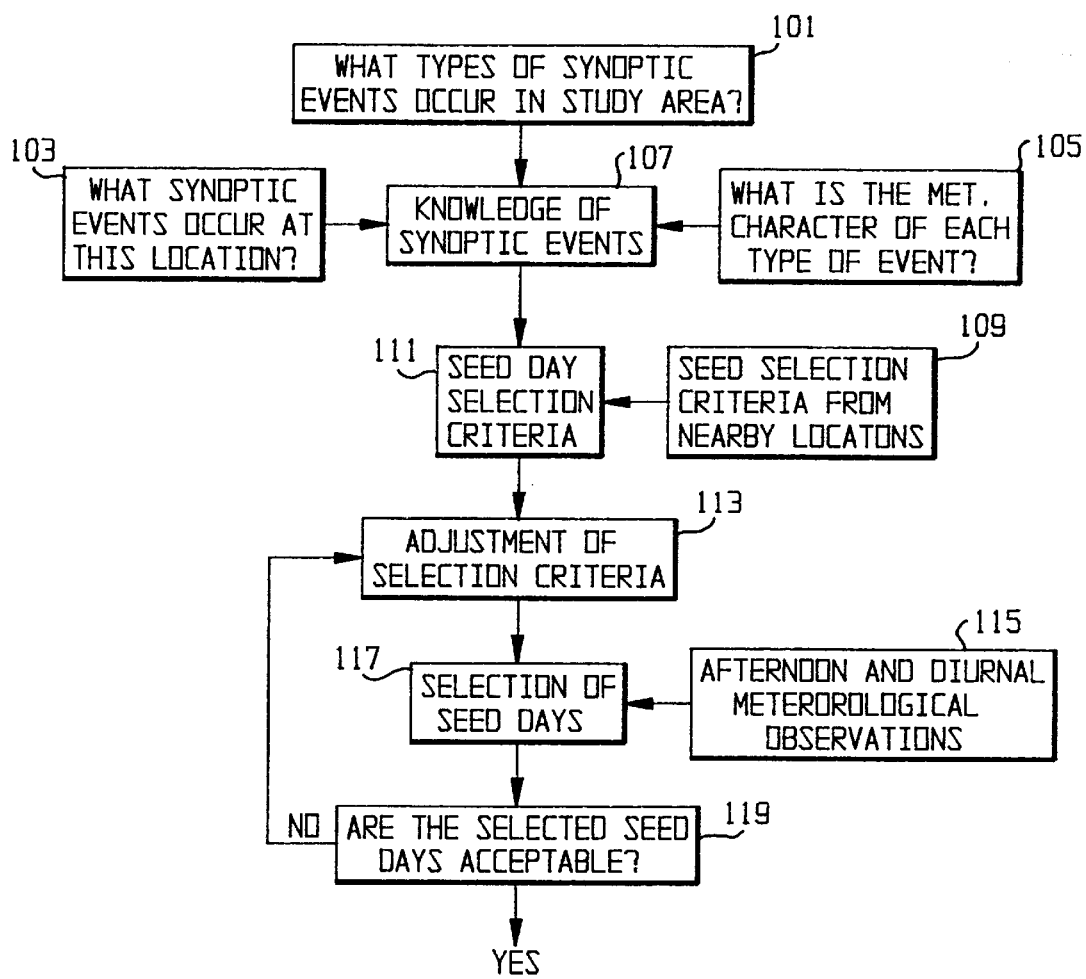
Figure 2:
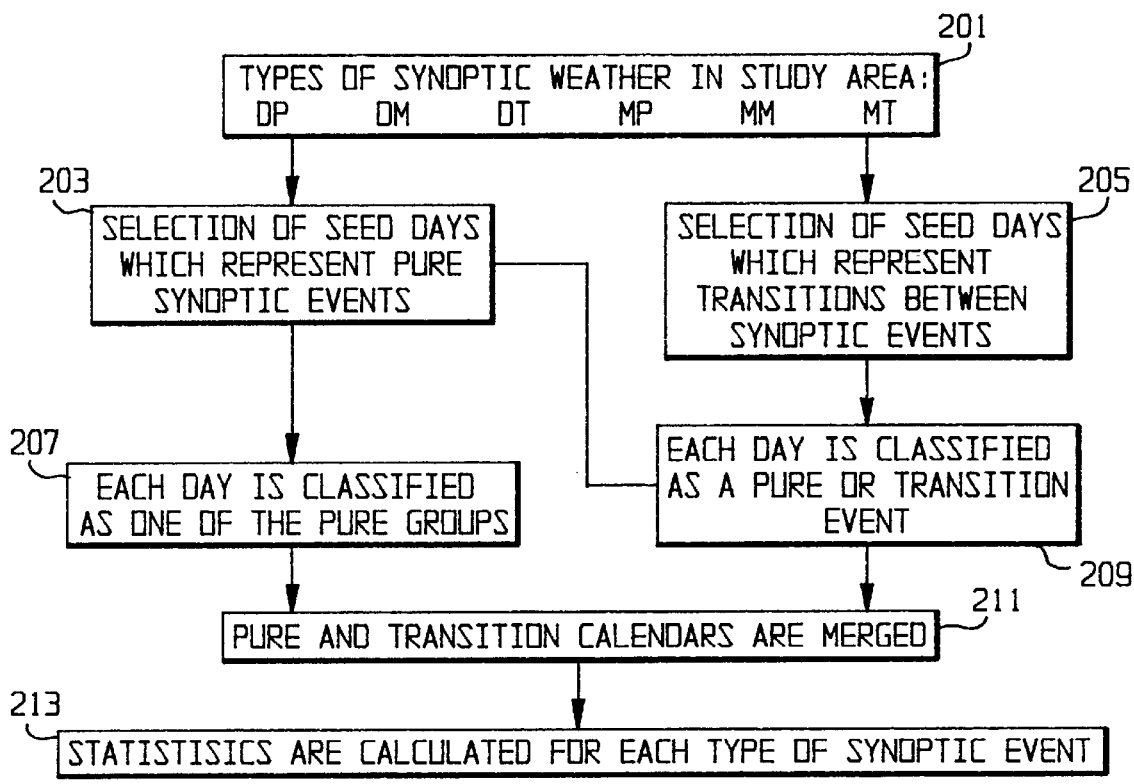

A preferred embodiment will be set forth in detail with reference to the drawings, in which like reference numerals refer to like components throughout.

The first step in the development of the SSC2 involves what is known as "air mass identification." For the purposes of SSC2, air mass identification focuses more on the meteorological characteristics of an air mass than its geographical source region. It considers ambient surface weather conditions and ignores pressure patterns, frontal theory, and conditions aloft. This necessitates a slight modification of the traditional definition of "air mass," although meteorological character and source region are highly interrelated. By concerning itself with local meteorological character, the SSC2 endeavors to serve as an especially useful tool for biometeorological needs, as organisms generally respond to ambient atmospheric conditions, not pressure patterns.

One of the ways in which the SSC2 overcomes the above-noted disadvantages of the SSC1 is an entirely new seed day selection process. The changes focus on two areas: a replacement of two seasons with four "windows" to create sliding seed days, and the transfer of seed days from station to station.

The desire for a year-round synoptic classification calendar necessitated a seed day selection scheme which would select days on a sub-season level, to accommodate the rapid air mass character changes during spring and autumn. Several methods were considered. A nested seed day selection process was suggested: winter and summer would retain their three-month long windows, while spring (March–May) and autumn (September–November) would be divided up into six biweekly periods each, in order to accommodate better the transitory nature of spring and autumn. Another method considered included a month-by-month selection of seed days. Neither of these methods account for the fact that air mass modification over the course of a year occurs gradually rather than incrementally. Further, these methods would require a significant increase in the number of seed day criteria to be developed, and the tedium of seed day verification would be necessary.

To avoid, these problems, the method of sliding seed days was developed. This method involves the identification of seed days in four two-week "windows" throughout the year, and the creation of an algorithm to produce an artificial seed day for each air mass for each day of the year. This method assures the gradual change inherent in the climate system, yet does not involve a burdensome amount of air mass identification.

The procedure starts, as before, with the identification of seed day criteria. Some changes in the parameters were made (Table 2 below). Minimum temperature is used in the place of diurnal temperature range and maximum temperature (of the four-six hourly observations) replaces the afternoon temperature. Diurnal dew point change and average cloud cover replace six-hourly dew point change and afternoon cloud cover. Due to the shortening of the seed day selection period, all reference to wind direction is eliminated.

TABLE 2

| Parameter | Minimum | Maximum |
|---|---|---|
| Maximum temperature | −30° C. | 30° C. |
| Minimum temperature | −130° C. | −70° C. |
| 16 h EST dew point | none | none |
| Mean daily cloud cover | 0 tenths | 7 tenths |
| 16 h EST dew point depression | 80° C. | none |
| Diurnal dew point change | none | 70° C. |

The four two-week periods shift by location, to correspond roughly to the hottest and coldest two weeks and the midway points in between. To discriminate among air masses, the SSC2 requires the following parameters: temperature at 04 h EST, temperature at 10 h EST, temperature at 16 h EST, temperature at 22 h EST, dew point depression (temperature minus dew point) at 04 h EST, dew point depression at 10 h EST, dew point depression at 16 h EST, dew point depression at 22 h EST, mean cloud cover (average of 04, 10, 16, and 22 h EST), mean sea level pressure (average of 04, 10, 16, and 22 h EST), diurnal temperature range (of values at 04, 10, 16, and 22 h EST), and diurnal dew point range (of values at 04, 10, 16, and 22 h EST).

FIGS. 3–6 present an example oft he sliding seed day calculation, for 16 h EST temperature for the MP air mass in Wilmington, Del. For each of the twelve parameters listed above, the long term mean in each of the four windows is calculated (Step 1). The mean of the seed days is determined (Step 2), and its difference from the long-term mean calculated (Step 3). To then obtain the sliding seed days, for each variable for each air mass two different annual curves are summed. The long-term (period of record) mean of a variable for each day of the year is calculated (Step 4). A linear function is fit to the differences calculated in Step 3 (Step 5). The annual curve and difference curve are then summed, and a tenth-order polynomial is fit to these data (Step 6). The inclusion of flank half-years (which are later discarded) around the "central year" eliminates the possibility of anomalous values near the end oft he polynomial's range. This process is repeated for every variable for every air mass. The resultant curves can then be evaluated for any particular day of the year and produce a "typical" set of characteristics for each air mass on that day.

A different procedure selects transitional seed days. For each of the biweekly windows, the mean and standard deviation of three variables are calculated:

diurnal dew point range (of values at 04, 10, 16, and 22 h EST), diurnal sea level pressure range (of values at 04, 10, 16, and 22 h EST), and diurnal wind shift (largest difference between any two wind vectors, from among the 04, 10, 16, and 22 h EST observations).

Any day for which all three parameters are at least 1.3 standard deviations above the period mean becomes a TR seed day. This specific threshold is chosen because in testing, seed days picked by this threshold produced similar transition frequencies to the SSC1.

With the SSC1, as mentioned above, seed days were picked individually for each station. Criteria were assumed to be similar at neighboring stations for each air mass; however, no attempt was made to try to obtain the same days for seed days. For the SSC2, a seed day transfer is added to the procedure in order to make a better assessment of local climatological differences. By using the same day when the same air mass was present over two stations, the local meteorological differences between the two locations can naturally be accounted for.

The start of the system was selected to be Wilmington, Del. (ILG), the station nearest the University of Delaware, and hence the climate which provided the most familiarity. The criteria were taken from the SSC1 and modified to account for the difference in coverage of each period, Once Wilmington's seed days were considered correct, the procedure then skipped from station to station. The exact procedure by which the seed days are transferred is described below in the discussion on the procedure for running the SSC.

The SSC1 provides each season with a pool of seed days which discriminant analysis requires. In contrast, with sliding seed days, only one (artificial) seed day is created for each day of the year. Therefore, a new approach to evaluation is necessary.

As discriminant analysis provides statistics difficult to comprehend, a simpler evaluation method is sought. To this end, several different methods involving the summing of z-scores have been tested. The first method is the simplest, an equally-weighted sum of squared z-scores. For each of the six air mass categories, the mean values for each of the variables are evaluated from the polynomials for the particular day of the year. They are then compared with the actual day's data by the following:

$$h_k = \sum_{i=1}^{12} \left(\frac{x_i - \mu_{ki}}{\sigma_i}\right)^2, \tag{5}$$

where i represents one of the 12 variables from Table 1, $x_i$ represents the value of variable i on the day being evaluated, $\mu_{ki}$ the derived mean value of variable i for air mass k from the sliding seed days, and $\sigma_i$ the standard deviation of variable i for day k (also calculated via a tenth-order polynomial). The $h_k$ score represents the amount of discrepancy between the typical air mass characteristics and the particular day; therefore the day receives the designation of the air mass which accrues the lowest $h_k$ score.

All oft he other methods tested involve non-rotated principal components analysis (PCA), described in the previous chapter as the initial step in the TSI. For this purpose, PCA would input the twelve variables for the entire period of record, and "reduce" these variables to eigenvectors and eigenvalues to represent the data. A selected number of eigenvalues are kept, and each day is then assessed by the formula:

$$h_k = \sum_{i=1}^{n} w_i \left(\frac{x_i - \mu_{ki}}{\sigma_i}\right)^2, \tag{5}$$

where n represents the number of components retained, w, the weight of eigenvalue i, and $x_i$, $\mu_{ki}$, and $\sigma_i$ are similar to above except for the transformed variables. This method has been tested with both 3 and 6 eigenvectors retained, and with the weights equal to the eigenvalue and the square root of the eigenvalue.

A typical example of the results from these tests is shown in Table 3. In all cases tested, the air mass calendar produced by the equally-weighted sum of squared z-scores showed the highest match percentage with the calendar produced by the SSC1. Given that using nontransformed variables yields much more useful and understandable error statistics and troubleshooting criteria, the use of PCA was discounted, and the equal weighting method was adopted for use in the SSC2.

TABLE 3

| Method | June | July | August |
| --- | --- | --- | --- |
| Equal weighting | 66 | .68 | 70 |
| PCA, 3 components, eigenvalue weight | 58 | 53 | 56 |
| PCA, 6 components, eigenvalue weight | 58 | 53 | 56 |
| PCA, 3 components, square of eigenvalue | 62 | 60 | 62 |
| PCA, 6 components, square of eigenvalue | 62 | 60 | 62 |

In the early stages of redevelopment, a problem of misclassification of extremely cold Dry Polar days as Dry Tropical was noticed. The very low values of dew point were outweighing the very low temperatures in classification; up to 2 percent of the coldest days in many northern stations (which obviously had no DT in winter) were being classified as DT. To combat this, the substitution of dew point depression for dew point was made in the classification algorithm. The DT problem was largely eliminated, while the frequency of the other air masses was not affected in most cases by greater than 0.5 percent. The initial evaluation of a particular day's air mass is performed as described above. As with the old SSC, the decision on whether a day is transitional or not is done after this original evaluation. The method used is similar to the primary evaluation, except that only three variables are evaluated: range of dew point, sea level pressure, and wind shift. While the SSC1 made comparison between transitional seed days and a pool of "non-transitional" seed days, the SSC2 actually compares the values of the transitional seed days to those of the particular air mass designation the day originally receives.

Putting the above methodology into practice involves several steps. As mentioned above, the initial step involves running (producing the calendar of air masses by day) the SSC for Wilmington, Del. Once this has been satisfactorily completed, the following process then iterates for each new station.

Figure 7:
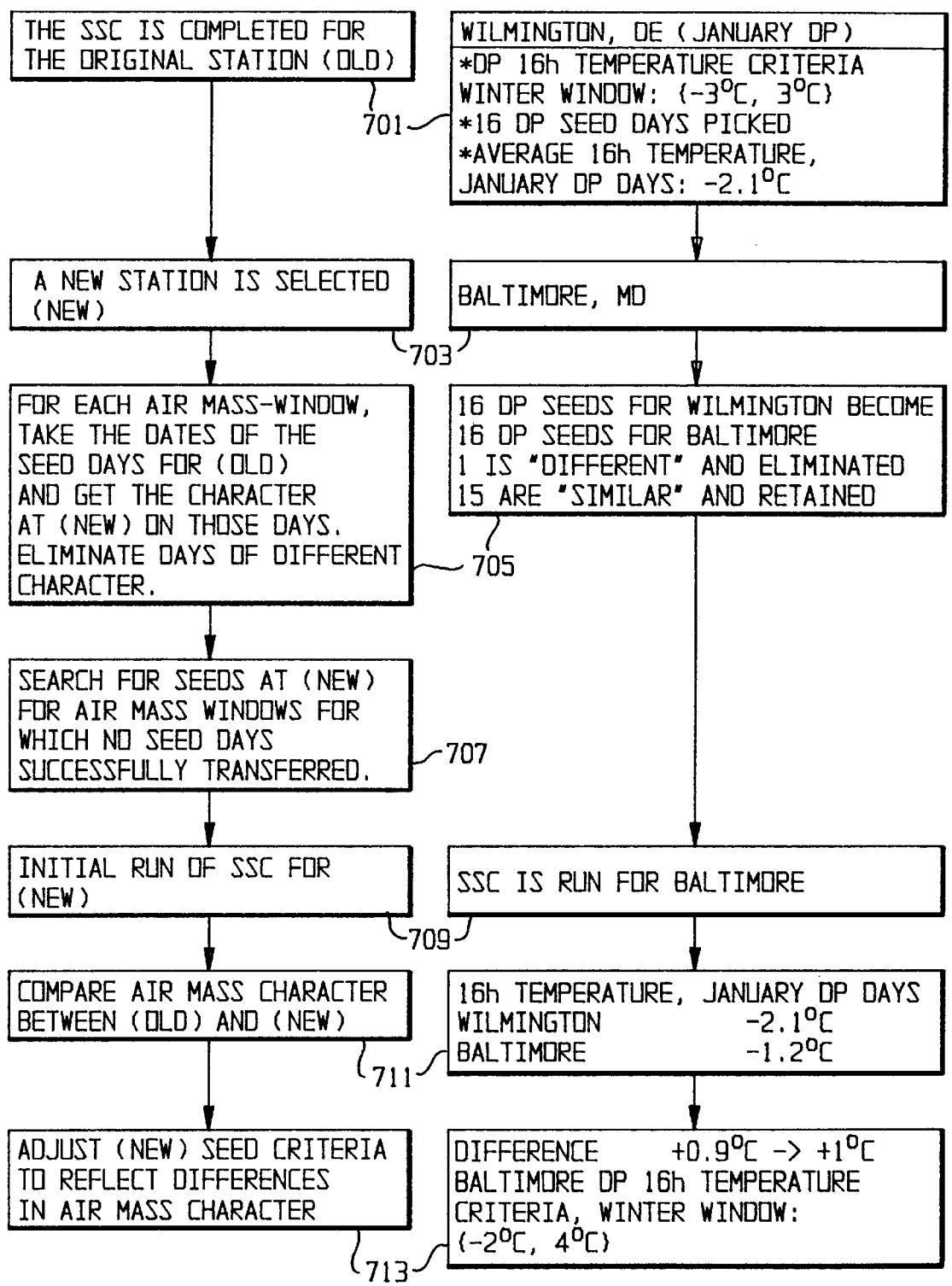
FIG. 7 is a flow chart showing the transfer of seed days from one location to a nearby location.

FIG. 7 highlights the first stage oft he procedure. The example provided is for the creation oft he Baltimore, Md. calendar, transferred from Wilmington, Del. While the example limits itself to the maximum temperature in January for Dry Polar (DP) seed days, it should be remembered that other variables for all four windows for each of the six air masses undergo modification at the same time.

Once the original station is completed (step 701), the next step involves the selection of the adjacent station (step 703). The station closest to an already-completed station, both in terms of geographic location and climate, is selected. Baltimore is only 90 km away from Wilmington, in a fairly homogeneous climate zone. The seed day transfer (step 705) then occurs. The same days which are seed days at the old station become seed days at the new station. Since there are occasions when the air masses at adjacent stations are dissimilar, a program eliminates days of markedly different character. The thresholds of markedly different character are listed in Table 4. For most transfers, fewer than 20 percent of days are eliminated. Transitional days are retained if the daily range of dew point is no more than 5° C. different, and sea level pressure range is within 3 hPa.

TABLE 4

| Window | Temperature 04, 10, 22 h EST | Temperature 16 h EST | Dew Point all obs. |
| --- | --- | --- | --- |
| Winter | 5.0 | 3.5 | 3.0 |
| Spring | 4.0 | 3.0 | 3.0 |
| Summer | 3.0 | 2.5 | 3.0 |
| Autumn | 4.0 | 3.0 | 3.0 |

On occasion, for a particular air mass in a particular window, no seed days will successfully transfer (step 707). This is generally limited to rarely occurring air masses, especially Dry Tropical, where moisture and thermal conditions vary widely. To run the SSC properly, all air masses for all windows must have at least one seed day. To get at least one seed day, initially a search is done on the new station's period of record using the old station's criteria. If no seeds are found within the two-week window, a six-week window, centered on the two-week window, is examined. If there are still no seed days, then either the criteria are modified according to climatological differences between the stations, or an artificial seed day is created, as will be described below.

For the example in FIG. 7, there are 16 DP seed days in the Wilmington record for the winter window. Of these 16, one day has markedly different character in Baltimore and is eliminated; the other 15 are retained.

Once all air mass windows have at least one seed day, the SSC is initially run for the second station (step 709). The difference in following characteristics of the air masses between the two stations is assessed (step 711):

maximum temperature,
minimum temperature,
afternoon dew point, and
afternoon dew point depression.

Modifications are then made to the seed day selection criteria of the new station (step 713). In this example, Baltimore's mean in maximum temperature of January seed days is 0.9° C. higher. As criteria are rounded to the whole degree, Baltimore's maximum temperature criteria are modified up 1°, from {−3°,3°} to {−2°,4°}.

On occasion, air masses with fewer than five seed days in both cities produce wild fluctuations in the mean character of air masses. To prevent this from infiltrating the system, for air mass windows with fewer than five seed days, the seed criteria cannot be modified by more than 2° C., unless the mean climatological difference exceeds 2° C.

In order to prevent excessive modification, polar and tropical air masses have set theoretical thermal thresholds which can not be exceeded. These thresholds are necessary in areas near the limit of penetration for a particular air mass, when the modification routine could be compromised, and unreasonable criteria selected. The thresholds are follows:

Moist Polar, summer window, cannot exceed 20° C.;
Dry Polar, summer window, cannot exceed 27° C.;
Moist Tropical, winter window, cannot be lower than 1 5° C.; and
Dry Tropical, winter window, cannot be lower than 1 6° C.

The second stage then begins, as shown in FIG. 8. The new, modified criteria are then used to select additional seed days (step 801) from the new station's entire period of record. These seed days are added to those retained above, with duplicate days eliminated. As there is only addition of seed days and no subtraction, all air mass windows have at least one seed day. The SSC is run for the second time (step 803), and the difference in air mass character between the new station's first and second runs is assessed (step 805). Modifications, usually smaller in magnitude and number, are made again to the seed day criteria (step 807).

In this example, Baltimore's new seed day criteria result in the selection of 18 seed days; of these, 11 are part of the original 15, and seven are new. The seven are added to the original 15 for a total of 22 DP seed days in the winter window. The SSC is run again for Baltimore, with this larger pool of seed days. Once completed, the difference in January DP maximum temperature between the first and second run is only ±0.2° C., resulting in no change being made to the winter window criteria for DP maximum temperature.

Figure 9:
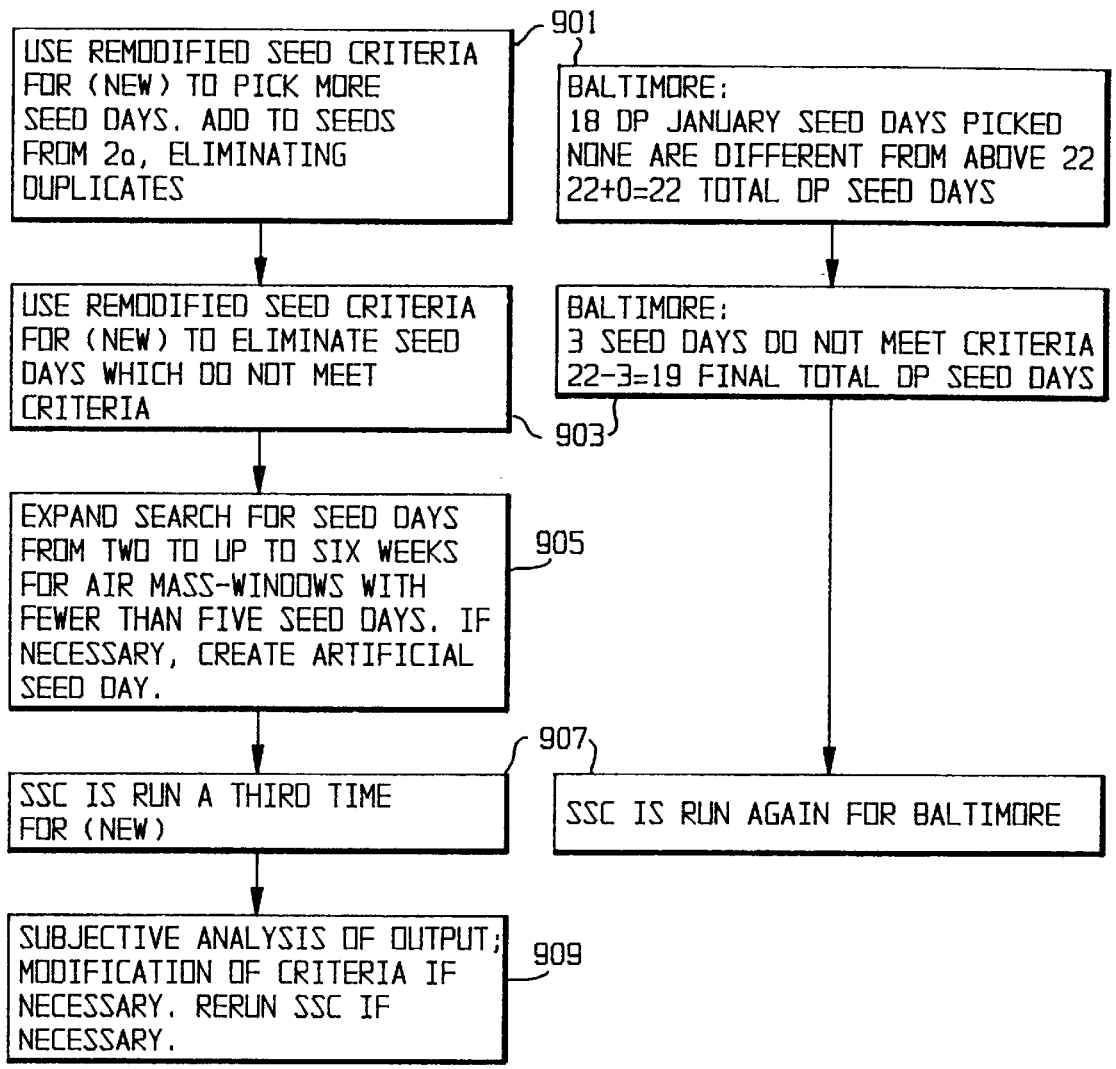
FIG. 9 is a flow chart showing another round in the selection of additional seed days in the nearby location.

The third stage of the SSC2 begins with another round of seed day selection, as shown in FIG. 9 as step 901. As few modifications are made after the second running, in general very few seed days are added here. The new seeds which are picked are merged with those used in the second run. A new program then sorts through all of the seed days, and eliminates those which do not meet the final seed day criteria (step 903). Most of the seed days which are eliminated in this procedure are the seed days copied from the original station; on average, 20 percent of seed days are eliminated in this stage. Any air mass windows for which there are fewer than five seed days are reported. In order to increase the robustness of the system, an attempt is made to increase the number of seed days within these groups. A search for new seed days 3° C. is then broadened temporally: the window is expanded symmetrically from two weeks until either five seed days are found, or the window reaches six weeks. In the event all seed days for a particular air mass window are eliminated in step 903, the seed criteria are either relaxed or an artificial seed day is created (step 905).

For the Baltimore example, no new different seed days are found, and three seed days (all dates copied from Wilmington) are found not to meet all of Baltimore's DP criteria. These three are eliminated, leaving 19 final DP seed days for the winter window.

The SSC is run once again (step 907), and results are compared with the old station and possibly other neighboring stations. The final stage is a subjective assessment of the frequency match amongst stations and mean character and frequency of the air masses (step 909).

Of course, once the seed days are selected for Baltimore, the same technique can be used to select seed days for weather stations near Baltimore, and so on. Thus, the selection of seed days can be propagated throughout the contiguous United States and Canada in a manner more computationally efficient than selecting seed days independently for each weather station.

The selection of artificial seed days will now be explained. As explained above, the SSC1 is run separately for winter and summer; when an air mass is present at a given location at one time of year and not another, one could easily accommodate the situation by not defining seed days for one of the seasons. However, with the SSC2, the continuous function which describes the sliding seed day does not allow for an absence of an air mass at a particular time of year. To remedy this problem, artificial seed days are created for locations where air masses are absent for part of the year.

The premise of an artificial seed day is geographic in nature: Where there is a limit of penetration of a particular air mass (and hence, a lack of adequate seed days), the assumption is made that if the air mass were to continue to penetrate in that direction, its conditions would be unmodified. Hence, the artificial seed day is defined to be the same as the average seed day conditions for the closest station for which the air mass is identified. The artificial seed day is then automatically transferred to all new stations; if later a seed day is discovered, the artificial seed day is deleted.

Only 50 of the 328 stations had no artificial seed days; most of these stations were located in a belt from Missouri to New York. Table 5 lists the number of artificial seed days for each air mass window. The tropical air masses, DT and MT, have by far the greatest dependence upon artificial seed days, with averages of 33 and 38 percent of stations, respectively. Virtually all Canadian and Alaskan stations have artificial seed days for at least three seasons; many of the interior US Rocky Mountain stations have artificial MT stations for all four seasons. The other air masses average below 10 percent; MP and DP in the summertime claim significant numbers of artificial seed days, almost entirely stations in the southern half of the United States. All of the 52 artificial seed days in DM in winter are Canadian. Otherwise, the moderate air masses are most reliably identified, as expected.

TABLE 5

| Air Mass/Season | 5 or more seed days | | 1 to 4 real seed days | | artificial seed day | |
|---|---|---|---|---|---|---|
| DRY MODERATE | | | | | | |
| Winter | 252 | 77% | 24 | 7% | 52 | 16% |
| Spring | 302 | 92% | 11 | 3% | 15 | 5% |
| Summer | 277 | 84% | 29 | 9% | 22 | 7% |
| Autumn | 285 | 87% | 28 | 9% | 15 | 5% |

TABLE 5-continued

| Air Mass/Season | 5 or more seed days | | 1 to 4 real seed days | | artificial seed day | |
|---|---|---|---|---|---|---|
| DRY POLAR | | | | | | |
| Winter | 301 | 92% | 20 | 6% | 7 | 2% |
| Spring | 300 | 91% | 20 | 6% | 8 | 2% |
| Summer | 241 | 73% | 26 | 8% | 61 | 19% |
| Autumn | 295 | 90% | 22 | 7% | 11 | 3% |
| DRY TROPICAL | | | | | | |
| Winter | 86 | 26% | 72 | 22% | 170 | 52% |
| Spring | 191 | 58% | 62 | 19% | 75 | 23% |
| Summer | 155 | 47% | −67 | 20% | 106 | 32% |
| Autumn | 170 | 52% | 66 | 20% | 92 | 28% |
| MOIST MODERATE | | | | | | |
| Winter | 271 | 83% | 42 | 13% | 15 | 5% |
| Spring | 262 | 80% | 52 | 16% | 14 | 4% |
| Summer | 268 | 82% | 48 | 15% | 12 | 4% |
| Autumn | 291 | 89% | 34 | 10% | 3 | 1% |
| MOIST POLAR | | | | | | |
| Winter | 310 | 95% | 12 | 4% | 6 | 2% |
| Spring | 285 | 87% | 28 | 9% | 15 | 5% |
| Summer | 219 | 67% | 34 | 10% | 75 | 23% |
| Autumn | 294 | 90% | 17 | 5% | 17 | 5% |
| MOIST TROPICAL | | | | | | |
| Winter | 126 | 38% | 30 | 9% | 172 | 52% |
| Spring | 168 | 51% | 49 | 15% | 111 | 34% |
| Summer | 196 | 60% | 21 | 6% | 111 | 34% |
| Autumn | 204 | 62% | 20 | 6% | 104 | 32% |
| TROPICAL | | | | | | |
| Winter | 319 | 97% | 9 | 3% | 0 | 0% |
| Spring | 307 | 94% | 12 | 4% | 9 | 3% |
| Summer | 281 | 86% | 29 | 9% | 18 | 5% |
| Autumn | 309 | 94% | 11 | 3% | 8 | 2% |

An additional consideration lies in the need for artificial transitional seed days. This arises in summer across the Florida peninsula, and all seasons except winter in Hawaii, extreme southern Florida, and the Caribbean. In these locations, there are virtually no extreme shifts in weather; as a result, the means and standard deviations of dew point range, pressure range, and wind shift are extremely low. When this occurs, days with high values of these parameters, relative to the station, but low values for transitional situations, are identified. The transitional frequency is then artificially inflated, with up to 12 percent in southern Florida in summer. To reduce these values to more reasonable levels, the same process mentioned above is applied to transitional situations. Stations in the locations mentioned above receive the mean transition seed day conditions for Jacksonville, Fla. (JAX) during the summer, and Miami, Fla. (MIA) during autumn and spring.

To obtain all of the needed parameters for the SSC2, the following variables are required: temperature, dew point, u-(cast-west) and v-(north-south) components oft he wind, cloud cover, and sea-level pressure. Each of these parameters is needed four times daily, at the following standard times:

for stations in Atlantic, Aleutian, and Newfoundland time zones: 05, 11, 17, and 23 h;

for stations in the Eastern time zone: 04, 10, 16, and 22 h;

for stations in the Central time zone: 03, 09, 15, and 21 h;

for stations in the Mountain time zone: 02, 08, 14, and 20 h;

for stations in the Pacific time zone: 01, 07, 13, and 19 h; for stations in the Alaska/Hawaii time zone: 00, 06, 12, and 18 h.

All of the meteorological data used in this study was made available by the National Climatic Data Center. Most Canadian stations are available for the period of 1953 to 1993 inclusive. Most US stations have data records running between 1948 and 1997; some begin as early as 1940, and many have missing data segments. Stations are included in this study if they had greater than 30 years of available data, or greater than 20 years if they were located in an area of sparse station density.

Data were received quality-controlled; further quality control to eliminate any values outside normal boundaries turned up virtually no errors. Only two modifications to the data were necessary. For US stations, the Automated Surface Observing System (ASOS), installed at all public airports between 1993 and 1995, eliminated the total sky cover observation used as cloud cover. In its place, it reports cloudiness at different levels: the assumption is made that cloud cover is equal to the most cloudy level. For Canadian stations, on very cold, dry days the observation of dew point was listed as "missing." In many Northwest Territory stations, up to 30 percent of winter days featured at least one "missing" observation. To reduce the number of missing days, whenever a station has all available observations except the dew point, and the temperature is below −30° C., the dew point is set to −50° C. or the actual air temperature, whichever is lower.

The principal benefit of the SSC2, in relation to the SSC1, is the availability of a year-round calendar which more appropriately deals with the change of season. The restriction of the SSC1 to six months of the year prohibits its use for many applications, as well as reducing the usefulness of the SSC to describe a region's climatology.

Another advantage of the SSC2 is the increase in "match percentage" among neighboring stations. The match percentage is the frequency of two adjacent stations receiving the same air mass classification for the same day. An increased match percentage inherently implies better spatial cohesion, and therefore more reliable classification system, since an underlying assumption is that the air masses are synoptic-scale features, even if the classification scheme limits itself to local meteorological conditions.

A sample match percentage, between Baltimore, Md. and Wilmington, Del., is presented in Table 6. Overall, despite the simpler evaluation techniques, the match percentage increases from 68 to 76 percent with the SSC2, a one-quarter reduction in mismatches. This improvement is fairly constant throughout the year. While a 5 to 10 percent increase is typical for the system, it must be noted that on 24 percent of the days, the two stations still do not agree. Some of this can be ascribed to true difference in air mass presence; that is, there are days on which the two cities do not have the same air mass. Also, transitional situations may be so timed as to include one station but not the other. Although impossible to quantify, it is likely that these situations account for at most half of the mismatches. The other days seem to reflect a feature observed when individual days' maps are plotted out: the appearance of a zone of mixed air mass classification, in between two. homogeneous areas. This mixed zone occurs more commonly in the summer, when the difference in air mass character is least pronounced, and least commonly in winter, when a stronger differentiation occurs. This is the likely explanation for the ubiquitous decrease in match percentage observed in the summertime months. This problem is inherent to any classification system of this sort, and while it has been abated, it has not been eliminated entirely.

TABLE 6

| Month | Match frequency | |
|---|---|---|
|  | SSC1 | SSC2 |
| January | 72 | 77 |
| February | 75 | 81 |
| March | N/A | 78 |
| April | N/A | 76 |
| May | N/A | 73 |
| June | 62 | 71 |
| July | 63 | 71 |
| August | 65 | 71 |
| September | N/A | 79 |
| October | N/A | 76 |
| November | N/A | 75 |
| December | 72 | 78 |
| Annual | 68 | 76 |

Once redevelopment was completed for the SSC2, the procedure was run for a total of 328 stations across Anglo-America. As the SSC2 is now available year-round, and includes twice as many stations over twice the area, it is first useful to review a climatology of the frequency and character of the six air masses and transition. Tables quoted in this climatology are based on the averages for the 1961–1990 period; all temperatures and dew points are given in degrees Celsius (C.). 1. Dry Polar (DP) air mass With the principal North American source region for Dry Polar (DP) conditions—cold, clear, and dry—located over the Canadian territories and Alaska, it is not surprising that DP is most often found there during all four seasons. Latitude plays the largest role in DP frequency: the farther south, the farther from the Dry Polar source region, and the greater the solar radiation to modify the conditions. Also important, however, is proximity to an open (unfrozen) body of water; the added moisture modifies the local climate conditions to reduce DP frequency. Still, these are general rules, with some notable exceptions; a season-by-season climatology follows. Table 7 presents the mean frequencies for ten North American stations by month.

TABLE 7

| STATION | Jan | Feb | Mar | Apr | May | Jun | Jul | Aug | Sep | Oct | Nov | Dec |
|---|---|---|---|---|---|---|---|---|---|---|---|---|
| Anchorage, AK | 35 | 32 | 37 | 35 | 34 | 24 | 18 | 25 | 30 | 36 | 35 | 28 |
| Baker Lake, NT | 77 | 77 | 74 | 53 | 29 | 39 | 26 | 23 | 17 | 27 | 60 | 73 |
| Calgary, AB | 37 | 32 | 30 | 25 | 24 | 25 | 25 | 22 | 28 | 27 | 34 | 37 |
| Dallas-Ft. Worth, TX | 15 | 10 | 8 | 6 | 5 | 1 | T | T | 2 | 3 | 7 | 13 |
| Miami, FL | 3 | 5 | 3 | 2 | T | T | — | — | — | — | T | 3 |
| Minn.-St. Paul, MN | 45 | 43 | 33 | 21 | 19 | 14 | 9 | 12 | 17 | 21 | 26 | 36 |
| Phoenix, AZ | 7 | 5 | 5 | 6 | 2 | — | — | — | T | 1 | 5 | 5 |

TABLE 7-continued

| STATION | Jan | Feb | Mar | Apr | May | Jun | Jul | Aug | Sep | Oct | Nov | Dec |
|---|---|---|---|---|---|---|---|---|---|---|---|---|
| St. Johns, NF | 22 | 26 | 22 | 24 | 22 | 19 | 11 | 11 | 20 | 24 | 21 | 19 |
| Seattle, WA | 8 | 4 | 4 | 15 | 30 | 32 | 28 | 19 | 16 | 15 | 9 | 7 |
| Wilmington, DE | 40 | 39 | 29 | 25 | 19 | | 7 | 8 | 11 | 23 | 24 | 34 |

Much of the North American continent most frequently experiences Dry Polar (DP) air during January. The north-south gradient is particularly steep east of the Continental Divide. January frequency is above 10 percent at all locations except in southern Texas and southern Florida. Frequency ranges from 10 to 30 percent across the southeastern and south central US, and 30 to 50 percent across much of the Rockies and northern US states. Most Canadian stations east of the Divide have DP present on more than half of January days, with exception of those in the Atlantic Provinces, where the maritime location suppresses frequency (as low as 20 percent in some locations). Frequency reaches a maximum of 70 to 80 percent at many Northwest Territories stations.

West of the Divide, the DP air mass has a harder time penetrating due to the Rocky Mountain barrier. Furthermore, the seasonal shift oft he Pacific High southward puts much oft he Pacific Coast into a regime with strong westerlies, bringing mild, humid air ashore over much of the winter. Hence, DP is significantly less common here than at stations at the same latitude on the other side of the mountains. Kamloops, BC (22 percent) has DP air only around one-third as often as Regina, SK, at the same latitude (59 percent). Frequency decreases southward and coastward; along the entire coast from California to Vancouver Island, DP occurs on less than one in ten January days. Frequency in Alaska is highly variable, dependent upon proximity to unfrozen sea; values increase from near 15 percent along the Aleutians to 55 percent at Barrow.

Interestingly, there is a local minimum of DP frequency at stations in the lee of the Great Lakes in December and January. Stations still observe frequencies near or at their annual maximum during this time of year, however values are lower than those of surrounding stations. As is described below, this minimum is a manifestation of the lake effect, and results in a local maximum of Moist Polar air as precipitation and cloud cover is increased in the region. That this pattern appears is testament to the focus of the SSC upon local meteorological character.

Following January, DP frequency declines at most stations fairly evenly. By April, frequency is under 30 percent over the entire eastern US; south of a line from Midland, Tex., to Oklahoma City, Okla., to Atlanta, Ga., on fewer than one in ten April days is DP observed. In the Rocky Mountains, frequency is between 20 and 35 percent. Among many Pacific locations, DP becomes more frequent through the spring (e.g., Seattle, Table 7), as the moisture flow off the Pacific Ocean abates. Inland stations of Washington, Oregon, and Idaho have frequencies above 30 percent; immediate coastal stations between San Francisco and Vancouver observe DP on around one in seven April days. Much of Canada and Alaska has frequencies above 30 percent, with a sharp increase noted leeward of the Rockies. Stations in the Northwest Territories again most commonly observe DP, as often as 88 percent of days at Alert.

A precipitous drop in DP frequency occurs during May and June; by July and August for all of North America (except the Pacific Coast) DP is at its annual minimum. Over the southern third of the US, except along the West Coast, DP air is virtually non-existent in July; only above a line from Boise, Id. to New York City is DP observed on more than 10 percent of days. Along the Pacific Coast, however, especially from British Columbia southward, the region is under the stable eastern edge of the Pacific High during summer. Subsiding air, and the upwelling of cold water along the coast, give the region a cool, dry summer, with an actual annual DP peak in July (10 to 25 percent), Much of Canada and Alaska has a Dry Polar air mass present on at least one of every four days, with a maximum frequency at Eureka, NT (60 percent).

For most continental US locations, DP frequency in autumn is quite similar to spring. Over most of Canada, however, DP remains markedly suppressed in early autumn, as more bodies of water are unfrozen. Many Northwest Territories stations (e.g. Baker Lake, Table 7) actually reach a minimum of DP frequency in autumn, with the low sunshine and still-open water producing a significant increase in MP.

Among the six air masses, DP features the coldest and driest conditions for nearly all stations for most oft he year. Skies are clear to partly cloudy year-round. DP also has a horizontal temperature gradient, or greatest rate of modification, significantly higher than all other air masses for much of the year. Table 8 compares two stations in the Great Plains: The Pas, MB, and Dallas-Fort Worth, Tex., separated by 2300 km but no appreciable topography. Dry Polar has the largest gradient in all months except July, with a peak in wintertime; the January difference of 26° is at least 100 greater than all other air masses.

TABLE 8

| | Temperature difference | | | |
|---|---|---|---|---|
| Air Mass | Jan. | Apr. | July | Oct |
| Dry Polar | 26 | 16 | 8 | 16 |
| Dry Moderate | 16 | 12 | 9 | 13 |
| Dry Tropical | N/A | 8 | 7 | 10 |
| Moist Polar | 15 | 12 | N/A | 10 |
| Moist Moderate | 15 | 13 | 7 | 13 |
| Moist Tropical | N/A | 12 | 8 | 10 |

Table 9 gives examples of DP air mass character for ten stations for North America. January mean afternoon temperatures are above 10° only in extreme southern California, Arizona, and Florida. The 0° isotherm drapes from Portland, Oreg., to Oklahoma City, Okla., to Norfolk, Va. Temperatures decline further to −10° to −20° along the Canadian border; the coldest mean conditions associated with DP are in the Northwest Territories, as low as −40°. Dew points are also extremely low; nowhere do they exceed −2°. Other than a relative maximum along the Pacific Coast, the gradient is largely north–south, with −10° to −15° dew points in the central US; and −25° to −35° dew points in central Canada.

DP conditions in April are not so extreme as in January for the US; afternoon temperatures range from 4° in the northern US Plains to 10° in New York City, to near 20° in southern Arizona, Texas, and Florida. Temperatures remain below freezing north of a line from Whitehorse, YT, across central Manitoba, to central Quebec. In the Canadian Archipelago, in areas abutting the still-frozen water, DP is only marginally warmer in April than January; Eureka, NT is coldest with a mean of −26°. April dew points range from around 6° along the Pacific Coast and Florida, to −5° along much of the Canadian border, to −10° to −15° across most of Canada and Alaska. A local minimum of −6° to −10° is observed in the Great Basin and southern Rockies.

As observed in Table 8, the sharp thermal gradient associated with DP air is diminished in July to a value comparable to that of other air masses, largely due to its scarcity in many locations. Mean afternoon temperatures in the southern US, where DP air can be identified, are between 25° and 27°; the northern tier of the US observes 22° to 24°. Temperatures of 18° to 20° are noted at most interior locations in Canada and Alaska, with lower temperatures near Hudson Bay (12° to 15°) and the Canadian Archipelago (7° to 10°). The upwelling along the Pacific Coast produces a sharp gradient along the immediate coastline, with mean temperatures as low as 19° at Vancouver and 22° at Los Angeles. Dew points feature only a slight north-south gradient; values range from 10° to 14° over much of the US and 4° to 9° over most of Canada and Alaska. The significant lack of moisture in the Great Basin is evident again, with several stations below 0° dew point.

diverse than the DP pattern. Some part of the continent has its maximum of DM in each of the four seasons (Table 10).

In January, DM is most commonly found in the Desert Southwest, where frequency is as high as 45 percent. Many of these days are modified Dry Tropical days, when the low sun angle and/or mixture of outside influence lower the temperature several degrees. Much of the US Plains, Rocky Mountains, California, and Nevada, as well as parts of the southeastern US, experience DM on between 30 and 40 percent of January days. The remainder of the contiguous US, southern British Columbia, Alberta, and Saskatchewan observe DM between 10 and 30 percent of January days. Northward of this area frequency decreases rapidly; most stations have DM frequency below 2 percent. The relative maximum of DM (relative to latitude) over much of the intermountain region and the Plains states is associated with Pacific air which has dried and adiabatically warmed upon crossing the Rockies. Along the northern edges of this region, from the Dakotas through Alberta, DM results on days of Chinook winds, although in strong Chinook situations the air mass is actually identified as Dry Tropical.

Frequencies increase at most stations throughout February and March, exceeding 50 percent at some valley stations in California. By April, most of the continent has a significantly greater DM presence; frequencies between 30 and 45 percent occur over much of the western and southeastern US, British Columbia, and the Prairie Provinces. Some

TABLE 9

| STATION | January | | | April | | | July | | | October | | |
|---|---|---|---|---|---|---|---|---|---|---|---|---|
| | T | Td | cc | T | Td | cc | T | Td | cc | T | Td | cc |
| Anchorage, AK | −15 | −21 | 4 | 3 | −8 | 5 | 17 | 9 | 6 | 1 | −7 | 5 |
| Baker Lake, NT | −35 | −40 | 3 | −18 | −23 | 3 | 12 | 3 | 6 | −13 | −16 | 5 |
| Calgary, AB | −15 | −21 | 6 | 7 | −7 | 5 | 20 | 6 | 5 | 7 | −5 | 5 |
| Dallas-Ft. Worth, TX | 3 | −10 | 4 | 17 | 1 | 3 | | N/A | | 18 | 2 | 3 |
| Miami, FL | 15 | −2 | 2 | 23 | 7 | 1 | | N/A | | | N/A | |
| Minn.-St. Paul, MN | −14 | −21 | 5 | 7 | −6 | 5 | 24 | 11 | 4 | 9 | −3 | 5 |
| Phoenix, AZ | 11 | −11 | 1 | 21 | −4 | 2 | | N/A | | 20 | −3 | 2 |
| St. Johns, NF | −9 | −14 | 5 | 3 | −5 | 5 | 15 | 8 | 5 | 4 | −1 | 6 |
| Seattle, WA | 1 | −11 | 5 | 11 | .2 | 7 | 19 | 10 | 7 | 13 | 5 | 4 |
| Wilmington, DE | −2 | −12 | 4 | 12 | −3 | 4 | 26 | 11 | 3 | 13 | 0 | 3 |

Over much of the continent, DP conditions are around the same to 2° warmer, with a dew point 1° to 3° higher, in October than in April. The only significant exception to this pattern is the region extending from Hudson Bay up through the Archipelago, where, due to the open water, temperatures are as much as 10° to 12° warmer. Temperatures are near freezing around James Bay, and −10° to −15° across the southern Archipelago.

With no absolute source region, and a variety of methods by which its conditions come about, the frequency pattern of the Dry Moderate (DM) air mass is considerably more stations, principally in the southeastern US (e.g., Miami, Table 10), even have their annual peak DM frequency during spring. This occurs as the sun is at a higher elevation, and the circulation over the region has not yet yielded to the southerlies around the Bermuda High (Ahrens 1994), which would bring Moist Tropical air into the region. Frequencies above 20 percent cover the remainder of the contiguous US, all of southern Canada except the Atlantic Provinces, and a tongue up through the Rockies into central Alaska. North and east of this line Dry Moderate air becomes much less common; in the Archipelago and Hudson Bay regions, it is still virtually nonexistent in April.

TABLE 10

| STATION | Jan | Feb | Mar | Apr | May | Jun | Jul | Aug | Sep | Oct | Nov | Dec |
|---|---|---|---|---|---|---|---|---|---|---|---|---|
| Anchorage, AK | 2 | 4 | 7 | 9 | 17 | 18 | 17 | 11 | 5 | 2 | 1 | 1 |
| Baker Lake, NT | — | — | — | — | T | 8 | 31 | 18 | 1 | — | — | — |
| Calgary, AB | 26 | 29 | 26 | 33 | 34 | 34 | 37 | 43 | 33 | 38 | 26 | 26 |
| Dallas-Ft. Worth, TX | 32 | 32 | 32 | 30 | 28 | 28 | 24 | 21 | 26 | 38 | 38 | 39 |
| Miami, FL | 24 | 27 | 28 | 38 | 23 | 3 | 2 | 3 | 3 | 18 | 25 | 26 |
| Minn.-St. Paul, MN | 14 | 16 | 18 | 28 | 25 | 27 | 32 | 34 | 29 | 33 | 24 | 12 |
| Phoenix, AZ | 43 | 33 | 34 | 24 | 23 | 17 | 6 | 13 | 18 | 27 | 45 | 54 |

TABLE 10-continued

| STATION | Jan | Feb | Mar | Apr | May | Jun | Jul | Aug | Sep | Oct | Nov | Dec |
|---|---|---|---|---|---|---|---|---|---|---|---|---|
| St. Johns, NF | 1 | 1 | 1 | 2 | 9 | 16 | 23 | 23 | 16 | 8 | 5 | 2 |
| Seattle, WA | 13 | 21 | 31 | 30 | 27 | 27 | 42 | 43 | 36 | 23 | 16 | 15 |
| Wilmington, DE | 21 | 20 | 27 | 28 | 24 | 24 | 25 | 29 | 34 | 35 | 32 | 24 |

The transition into the summer brings several pronounced shifts in the presence of DM. Between May and June, DM air becomes notably less common in the Southeast, supplanted by Moist Tropical days. By July, stations immediately along the Gulf Coast have DM on fewer than one day in ten; in the inland Southeast this increases to 10 to 20 percent. Stations in the low desert experience the same precipitous drop, although here DM is replaced by Dry Tropical (as well as Moist Tropical in monsoon areas). On all sides of the low desert, however, DM is the most common air mass in summer. Most stations near the Continental Divide in the US have DM on more than half of all days; the 40 percent contour encompasses most of the US Rockies, interior Washington, Oregon, and northern California. Much of this region has its maximum DM frequency at this time of year. DM frequency across the rest of the continent ranges between 20 and 35 percent in most locations, except for coastal stations in Alaska and the Canadian Archipelago, where frequencies drop to 2 percent.

The autumn brings a return of increased DM frequency to the low desert and southeastern US, with both areas experiencing DM on one in three October days. The maximum frequency, 40 to 55 percent, once again is found in a region extending from Edmonton to El Paso. Outside this area, virtually the entire contiguous US experiences DM on around one day in three; for much of the eastern half of the US and southeastern Canada, DM peaks in autumn. Northward of a line from Edmonton to Montreal, DM frequency declines significantly. Northward penetration of DM into Alaska and the interior of the Northwest Territories is much less common in October than April (Fairbanks: 5 percent October, 26 percent April), as the solar angle is much lower, and water bodies are unfrozen; MP air thus dominates.

The DM air mass (Table 11) is characterized by mild, dry, conditions with clear to partly cloudy skies year-round; for much of the mid-latitudes, this signifies temperatures warmer than average in winter, and near to slightly cooler than average in summer. In areas where tropical air masses do not penetrate, the DM air mass is often associated with the highest absolute temperatures.

During January, DM afternoon temperatures across the continent are arranged in the usual north-south gradient; the gradient is fairly strong across the US, with temperatures from 12° to 16° across the southern states, and 2° to 8° across the much of northern tier. The gradient becomes weaker in Canada and Alaska, where the air mass is very infrequent. The 0° isotherm parallels the US-Canadian border over the eastern half of the continent, and runs through northern Alberta and British Columbia farther west. Moving northward, afternoon temperatures do not get much below −4° before the air mass is no longer identified. Dew points are low with DM in January. A large area of −4° to −10° covers nearly all of Canada, Alaska, the US Rockies, and the northeastern US. Dew points increase significantly near the Pacific and Gulf Coasts, with values between 4° and 6° at many locations.

During April, the thermal gradient over much of the continent is aligned almost perfectly north–south, with little terrain influence. Afternoon temperatures are mostly between 20° and 25° in the southern half of the US, 14° to 18° across the northeastern and north central US, and 10° to 14° over southern Canada and the interior of the Canadian territories and Alaska. Dew points are again very low, with 0° to −4° covering all of Canada and the US Rockies, and 0° to 6° over much of the rest of the US. The Gulf Coast is the only exception, with an average afternoon dew point over 10°.

TABLE 11

| | January | | | April | | | July | | | October | | |
|---|---|---|---|---|---|---|---|---|---|---|---|---|
| STATION | T | Td | cc | T | Td | cc | T | Td | cc | T | Td | cc |
| Anchorage, AK | 1 | −6 | 7 | 9 | −3 | 5 | 20 | 9 | 5 | 11 | 0 | 7 |
| Baker Lake, NT | | N/A | | | N/A | | 19 | 6 | 5 | | N/A | |
| Calgary, AB | 4 | −8 | 5 | 13 | −5 | 6 | 24 | 8 | 4 | 15 | −2 | 5 |
| Dallas-Ft. Worth, TX | 14 | −1 | 3 | 24 | 8 | 3 | 34 | 17 | 3 | 25 | 8 | 2 |
| Miami, FL | 21 | 9 | 3 | 26 | 14 | 3 | 32 | 22 | 5 | 27 | 17 | 3 |
| Minn.-St. Paul, MN | 1 | −6 | 5 | 16 | −1 | 5 | 28 | 13 | 3 | 16 | 3 | 4 |
| Phoenix, AZ | 17. | 1 | 4 | 25 | (° C.) | 3 | 38 | 14 | 3 | 27 | 5 | 2 |
| St. Johns, NF | | N/A | | 10 | 3 | 6 | 21 | 11 | 5 | 9 | 4 | 4 |
| Seattle, WA | 7 | −1 | 5 | 15 | 4 | 5 | 24 | 12 | 3 | −17 | 9 | 5 |
| Wilmington, DE | 7 | −3 | 6 | 18 | 2 | 4 | 29 | 15 | 4 | 19 | 7 | 4 |

The thermal gradient lessens further in July; almost the entire US, except New England and immediate Pacific Coast, has afternoon temperatures between 28° and 33° on DM days. Interior Canada and Alaska has afternoon temperatures above 23°; in the Canadian Archipelago mean temperatures range as low as 11° for stations at which DM rarely occurs. Dew points once again are lowest over the US Rockies and northern Canada and Alaska; in both areas dew points are below 7°. Southeastern Canada, the Pacific Coast, and the north central and northeastern US have dew points between 10° and 15°. Values remain well below 20° except along the immediate Gulf Coast.

October mean conditions are very similar thermally to those of April; differences rarely exceed 2°. Dew points, however, are 2° to 5° higher along the Pacific Coast and in a region from the northern US Plains to southern Ontario.

The Dry Tropical (DT) air mass is the least common of the six air masses in terms of areal coverage and mean frequency. As with DP, it has a source region over the North American continent: the Sonoran Desert of Mexico and the southwestern US. DT frequencies, unsurprisingly, are highest in this vicinity throughout the year (Table 12). As downsloping winds also may produce unseasonably hot and dry conditions over many areas, much of North America receives some DT air. However, all of Alaska, nearly all of the Canadian territories, along with the Canadian north Atlantic coast have virtually no DT days in their period of record.

During January, due to the low sun angle, DT is at its most contained. Only a small area of the continent, from southern California to western Texas and southern Colorado, observes DT on more than one day in ten. Phoenix is one of only three stations with frequency above 20 percent. Coastal California stations, from Los Angeles to San Diego, actually have their highest DT frequency of the year in January (12 to 18 percent), comprised of days with downsloping Santa Ana winds. Frequencies from 2 to 8 percent encompass much of the Southeastern US, the Plains states, and Rockies east of the Divide. Within the Rockies, DT air is identified as far north as Calgary, on days with extremely strong Chinook winds. Outside of these areas, DT is virtually non-existent.

The higher sun angle, strong westerlies, and the lack of influence of the Bermuda High over North America make springtime—April (south), May (north)—the peak months of DT for much of North America east of the Mississippi River. The area which experiences DT on at least 2 percent of days includes all of the US and southern Canada except for the northwest Pacific Coast, Maine and the Atlantic Provinces, and southern Florida. Over a large area of the Plains states and interior southeastern US, frequency exceeds 10 percent. Very frequent occurrence of DT air (25 to 46 percent), is still limited to the southwestern quadrant of the US, from Las Vegas to Amarillo.

air (20 to 35 percent) is located over western and central Texas up through western Nebraska. Much of the remainder of the western US observes DT between 10 and 20 percent of days; for non-coastal locations in the eastern US and the southern Prairie Provinces, values of 2 to 6 percent are common; elsewhere, DT is rare.

With the abatement of the monsoon, the maximum frequency of DT returns to the low desert region by October, as high as 58 percent at Phoenix. The region of greater than 20 percent frequency only includes western Texas, southern New Mexico, 0 of Arizona, and adjacent regions of California and Nevada. Outside of this area and several isolated places in the interior southeastern US and Plains states, most US stations range between −2 and −8 percent. Aside from the southern Prairie Provinces (2 to 10 percent), almost no Canadian stations observe DT on more than 2 percent of days.

Where Dry Tropical occurs, it is associated with the highest temperatures and the largest dew point depression year-round (Table 13). In January, over the desert Southwest afternoon temperatures range from 19° to 24°, with dew points between −4° and −8°. Along the southern California coast, temperatures are 22° to 25° with dew points near 0°. In other areas, DT temperatures range from near to 10° in southern Alberta, to 16° in New York City, and 220 in Jacksonville; dew points are generally between −6° and 20.

Thermal conditions in April with the DT air mass have little gradient; temperatures are as high as 30° in southern Arizona and Texas, and between 22° and 27° over the rest of the region which experiences DT on more than 2 percent of days. In much of the Rockies and southwestern US, dew points are well below zero (as low as −11° in Albuquerque), with a sharp gradient moving east. Dew points in the northern tier of the US and southern Canada range from 2° to 7°; in the Southeast, they range from 8° to 10°.

July DT afternoons, have the highest temperatures for any air mass for any time of year. Much of the southern half of

TABLE 12

| STATION | Jan | Feb | Mar | Apr | May | Jun | Jul | Aug | Sep | Oct | Nov | Dec |
| --- | --- | --- | --- | --- | --- | --- | --- | --- | --- | --- | --- | --- |
| Anchorage, AK | — | — | — | — | — | — | — | — | — | — | — | — |
| Baker Lake, NT | — | — | — | — | — | — | T | — | — | — | — | — |
| Calgary, AB | 2 | 3 | 1 | 4 | 6 | 3 | 3 | 4 | 5 | 8 | 3 | 1 |
| Dallas-Ft. Worth, TX | 8 | 12 | 11 | 8 | 1 | 4 | 20 | 23 | 7 | 10 | 8 | 8 |
| Miami, FL | 2 | 2 | 2 | 2 | 2 | T | — | — | T | 3 | 2 | 2 |
| Minn.-St. Paul, MN | — | T | 1 | 8 | 11 | 8 | 9 | 5 | 3 | 5 | 1 | T |
| Phoenix, AZ | 30 | 44 | 38 | 46 | 58 | 66 | 45 | 45 | 60 | 58 | 36 | 23 |
| St. Johns, NF | — | — | — | — | T | T | T | — | — | — | — | — |
| Seattle, WA | T | 2 | 2 | 2 | 3 | 4 | 4 | 4 | 1 | T | T | T |
| Wilmington, DE | T | 2 | 5 | 7 | 7 | 2 | 3 | 3 | 4 | 4 | 3 | T |

Following April, global pressure patterns shift. By July, anticyclones in the Northern Hemisphere have shifted from land to ocean. The stronger Bermuda High limits DT intrusions in eastern locations; the Pacific High, and disappearance of the High over the Great Basin, dramatically reduces the occurrence of Santa Ana winds, and DT frequency falls along the Pacific Coast to near zero. DT becomes much more common in summer over the southwestern US, southern Great Plains, and Rockies. In most low desert locations, DT is most common in June (50 to 65 percent), before the appearance oft he monsoon, advecting moisture into the region (see Phoenix, Table 12). The rest of these regions have a maximum in July. Daggett, Calif. has DT on five of six July days; almost all stations within the Great Basin have frequencies above 30 percent. A secondary maximum of DT the US, away from the immediate coast, and much of the US Great Plains have afternoon temperatures above 36°, as high as 41° in Yuma, Ariz. and Phoenix. The remainder of the US averages between 32° and 36°, while the Canadian stations which experience D° F average between 30° and 33°. The dew point gradient once again is extremely large; several stations in the Great Basin and Rockies have dew points below 0°; the entire region is below 6°. A sharp increase is observed across the Great Plains, with the increased influence of Gulf of Mexico moisture: the average DT dew point increases from. 1° in Albuquerque to 11° in Amarillo, Tex., 17° in Dallas, and 19° over much of the Southeast. On its infrequent excursions into Southeastern Canada and the Northeastern US, dew points are between 13° and 17°.

October DT conditions are generally similar to those of April, although the southwestern US and Great Plains are 2° warmer, with temperatures from 26° to 32°. The Ohio Valley and Mid-Atlantic are 2° cooler, with temperatures between 24° and 26°. Dew points average 1° to 30 higher in October over most of the continent.

TABLE 13

| STATION | January | | | April | | | July | | | October | | |
|---|---|---|---|---|---|---|---|---|---|---|---|---|
| | T | Td | cc | T | Td | cc | T | Td | cc | T | Td | cc |
| Anchorage, AK | | N/A | | | N/A | | | N/A | | | N/A | |
| Baker Lake, NT | | N/A | | | N/A | | | N/A | | | N/A | |
| Calgary, AB | 9 | −9 | 5 | 21 | −5 | 5 | 29 | 4 | 2 | 22 | −1 | 4 |
| Dallas-Ft. Worth, TX | 22 | 1 | 3 | 29 | 7 | 2 | 38 | 17 | 2 | 32 | 10 | 2 |
| Miami, FL | 23 | 7 | 3 | 30 | 11 | 2 | | N/A | | 29 | 14 | 2 |
| Minn.-St. Paul, MN | | N/A | | 24 | 2 | 3 | 34 | 16 | 3 | 25 | 6 | 4 |
| Phoenix, AZ | 21 | −3 | 3 | 31 | −2 | 3 | 41 | 9 | 3 | 33 | 4 | 2 |
| St. Johns, NF | | N/A | | | N/A | | | N/A | | | N/A | |
| Seattle, WA | | N/A | | 22 | 2 | 4 | 30 | 12 | 2 | | N/A | |
| Wilmington, DE | | N/A | | 26 | 6 | 3 | 35 | 16 | 4 | 24 | 9 | 3 |

The Moist Polar (MP) air mass nearly always develops adjacent to or over cold bodies of water. As a result, its frequency pattern over the North American landmass is less cohesive than those of the three dry air masses, especially DP and DT, whose geneses are over the continent (Table 14).

During January the regions most affected by MP (greater than 30 percent) are the Atlantic Provinces, stations in the lee of the Great Lakes, and a wide coastal area from Alaska down to Washington, all regions which have frequent onshore flows from cold bodies of water. Much of the rest of the continent has MP air in between 10 and 25 percent of days, with higher values nearer the peak areas mentioned above. Values less than 10 percent are found across Florida, the Southwest, and northern Plains states and southern Prairie Provinces.

The bulk of MP occurrence shifts northward through the remainder of the winter. By April, stations in a region from the partially melted southern end of Hudson Bay eastward through the Atlantic Provinces have MP air on every other or every third day. The same frequency is found in much of southern Alaska and along the immediate Pacific Coast from Yakutat, Ak., to Eureka, Calif. Apart from these locations, however, MP air is present on less than one day in four, with frequency under 10 percent over nearly the entire southern half of the US. No local maximum is observed in the Great Lakes region after February.

By the summer, MP air is largely eliminated from the contiguous US, where frequency is under 2 percent across much of the US, and only above 10 percent along the immediate Pacific Coast. Over the interior of Canada, and in much of the Atlantic Provinces, frequency ranges between 10 and 25 percent. Near Hudson Bay and in the Archipelago, with the water now unfrozen, NIP frequency increases significantly by July, to 30 to 60 percent. The highest frequency of MP air, however, is still along the immediate Pacific Coast and in Alaska. Frequency increases from 30 percent in Eureka, Calif., to near 60 percent at Sandspit, BC. Over Alaska, MP frequency ranges from 32 percent at McGrath, in the interior, to as high as 96 percent at St. Paul Island.

TABLE 14

| STATION | Jan | Feb | Mar | Apr | May | Jun | Jul | Aug | Sep | Oct | Nov | Dec |
|---|---|---|---|---|---|---|---|---|---|---|---|---|
| Anchorage, AK | 40 | 38 | 36 | 44 | 38 | 44 | 47 | 43 | 45 | 48 | 47 | 50 |
| Baker Lake, NT | 11 | 11 | 11 | 23 | 53 | 43 | 23 | 38 | 69 | 60 | 25 | 16 |
| Calgary, AB | 11 | 18 | 26 | 22 | 22 | 17 | 14 | 14 | 20 | 12 | 19 | 15 |
| Dallas-Ft. Worth, TX | 17 | 17 | 10 | 3 | 2 | 1 | T | T | 2 | 6 | 12 | 12 |
| Miami, FL | 1 | 1 | T | T | — | — | — | — | — | — | T | T |
| Minn.-St. Paul, MN | 15 | 16 | 19 | 14 | 10 | 5 | 3 | 3 | 10 | 13 | 27 | 29 |
| Phoenix, AZ | T | 1 | 2 | 2 | T | — | — | T | — | T | 1 | 2 |
| St. Johns, NF | 44 | 42 | 47 | 54 | 45 | 34 | 22 | 23 | 25 | 33 | 39 | 49 |
| Seattle, WA | 31 | 18 | 20 | 25 | 18 | 17 | 11 | 11 | 18 | 31 | 38 | 36 |
| Wilmington, DE | 18 | 15 | 12 | 10 | 9 | 4 | 2 | 2 | 3 | 5 | 8 | 16 |

MP air advances back southward as the summer becomes autumn. By October, frequency ranges between 2 to 10 percent over the southern US and 10 and 20 percent over the northern US. Across the northern half of Canada and Hudson Bay, with water still unfrozen, the high MP values observed in summer persist. Frequencies exceed 60 percent at several stations along the Bay and in. the western Northwest Territories, and remain high until the sea freezes. The maximum along the Pacific Coast is once again found in October, with frequencies slightly lower than in July; values range from 20 percent in Eureka, Calif., to 50 to 60 percent on the Alaskan coast.

MP is the cloudiest air masses year-round, with skies averaging over eight-tenths cloudy virtually everywhere all four seasons (Table 15). It also has the smallest dew point depression of any air mass, and is responsible for the lowest summertime temperatures, colder than DP, whose days bring considerably more sunshine. Not surprisingly, the diurnal temperature range is lowest with the MP air mass, often below 2° year-round (Table 16 provides an example for Kansas City, Mo.).

During January, overcast conditions keep MP days considerably warmer than their polar counterpart DP. This difference is especially strong in areas closer to DP's source region. Afternoon MP temperatures are as high as 12° over southern Florida and California. Over the eastern half of the continent, the usual north-south gradient exists, with temperatures between 0° and 6° across the southeastern US, −6° to −8° across the US-Canadian border, ranging down to 15° in the Hudson Bay region and −20° to −30° in the Archipelago. At stations west of the Continental Divide, MT air is considerably warmer than their eastern neighbors at similar latitudes. Temperatures are especially high near the Pacific Coast, with a mean above freezing in the Aleutians and all of coastal British Columbia, and 5° or higher along all of the US Pacific Coast. Over the entire continent, the dew point is within 21 to 4° of the temperature, with lower values nearer the coasts and in more northerly locations.

April MP temperatures are around the same as April DP temperatures. The Gulf Coast and extreme southern California and Arizona are warmest, with temperatures as high as 15°. Temperatures are above 10° across much of the southeastern US, California, and Oregon. The 5° isotherm crosses from the Alaska–British Columbia border, southwestward to Cheyenne, Wyo., and then east-north-eastward to Portland, N.Mex. Temperatures are only below freezing northward of a line from central Alaska to central Quebec; across far northern regions, temperatures average as low as −17°. Dew points in April are generally 4° to 6° below the temperature, with higher depressions inland and south.

significantly cooler, with temperatures generally between 3° and 10°. Dew points are between 2° and 5° below the temperature, except in the Great Basin and Rockies, where the rare MP day has a dew point depression of between 6° and 8°.

October MP conditions, due to the higher water temperatures, are warmer than those of April MP conditions. Temperatures reach a maximum of 16° to 18° along the Gulf and southern California coasts, and are above 10° along the Pacific coastline up to British Columbia, and across the southern half of the US. The northern half of the US, and the remainder of the Pacific Coast through Alaska, observe temperatures between 50 and 10°; much of Canada is between 0° and 5°. The Hudson Bay region, with temperatures near freezing, is nearly 10° warmer in October than April on MP days. Only in the far northern Archipelago, where the water already has begun to freeze, does the temperature drop significantly, to around −10° to −15°.

The Moist Moderate (MM) air mass does not have a source region. Rather, it can arise over the ocean, after residing over mild water for a prolonged period of time. It also often arises as a modification of either the MP or MT air mass, or in a zone between the two, representing mixed influence. Most often, however, in winter it is associated with overrunning aloft. As a result, its frequency pattern is the least cohesive of the six air masses, although it tends to appear more regularly along the coasts (Table 17).

TABLE 15

| STATION | January | | | April | | | July | | | October | | |
| --- | --- | --- | --- | --- | --- | --- | --- | --- | --- | --- | --- | --- |
| | T | Td | cc | T | Td | cc | T | Td | cc | T | Td | cc |
| Anchorage, AK | −6 | −8 | 8 | 4 | −2 | 9 | 15 | 9 | 9 | 3 | 0 | 9 |
| Baker Lake, NT | −22 | −26 | 9 | −9 | −11 | 8 | 10 | 7 | 9 | −4 | −6 | 9 |
| Calgary, AB | −10 | −13 | 9 | 1 | −4 | 9 | 14 | 9 | 8 | 3 | −1 | 9 |
| Dallas-Ft. Worth, TX | 2 | −2 | 9 | 13 | 8 | 8 | | N/A | | 14 | 9 | 9 |
| Miami, FL | | N/A | | | N/A | | | N/A | | | N/A | |
| Minn.-St. Paul, MN | −5 | −8 | 9 | 5 | 0 | 9 | 18 | 13 | 8 | 8 | 3 | 9 |
| Phoenix, AZ | | N/A | | 14 | 7 | 8 | | N/A | | | N/A | |
| St. Johns, NF | −4 | −7 | 8 | 0 | −2 | 9 | 11 | 9 | 9 | 6 | 4 | 9 |
| Seattle, WA | 4 | 1 | 9 | 9 | 4 | 9 | 16 | 12 | 9 | 11 | 7 | 8 |
| Wilmington, DE | 1 | −3 | 9 | 9 | 5 | 9 | 19 | 15 | 9 | 11− | 7 | 9 |

TABLE 16

| | Temperature range | | | |
| --- | --- | --- | --- | --- |
| Air Mass | Jan. | Apr. | July | Oct. |
| Dry Polar | 6 | 10 | 9 | 9 |
| Dry Moderate | 9 | 10 | 11 | 11 |
| Dry Tropical | 14 | 14 | 12 | 13 |
| Moist Polar | 2 | 2 | 2 | 2 |
| Moist Moderate | 3 | 3 | 5 | 3 |
| Moist Tropical | 5 | 7 | 8 | 5 |

In July, the overcast conditions significantly reduce incoming radiation, keeping MT significantly cooler than DP. Afternoon temperatures are highest (22°) at those stations in the Desert Southwest and the Gulf Coast at which MP can be identified; much of the US is between 180 and 210. For most of Canada and Alaska, MIP temperatures are remarkably homogeneous, between 14° and 17°, although stations in the Hudson Bay region and Archipelago are

TABLE 17

| STATION | Jan | Feb | Mar | Apr | May | Jun | Jul | Aug | Sep | Oct | Nov | Dec |
|---|---|---|---|---|---|---|---|---|---|---|---|---|
| Anchorage, AK | 17 | 16 | 11 | 2 | 3 | 8 | 14 | 16 | 12 | 6 | 6 | 11 |
| Baker Lake, NT | — | — | — | 1 | 1 | 1 | 9 | 14 | 5 | 1 | 1 | T |
| Calgary, AB | 12 | 9 | 10 | 5 | 6 | 9 | 9 | 9 | 6 | 5 | 9 | 9 |
| Dallas-Ft. Worth, TX | 10 | 11 | 10 | 14 | 17 | 12 | 10 | 11 | 17 | 14 | 11 | 11 |
| Miami, FL | 11 | 10 | 7 | 5 | 13 | 23 | 14 | 15 | 18 | 12 | 9 | 8 |
| Minn.-St. Paul, MN | 10 | 12 | 14 | 10 | 14 | 15 | 14 | 16 | 16 | 11 | 10 | 8 |
| Phoenix, AZ | 4 | 3 | 3 | 1 | T | T | 1 | 2 | 3 | 3 | 4 | 6 |
| St. Johns, NF | 12 | 14 | 13 | 11 | 13 | 15 | 25 | 25 | 21 | 17 | 15 | 11 |
| Seattle, WA | 34 | 38 | 33 | 20 | 13 | 12 | 9 | 17 | 20 | 20 | 24 | 31 |
| Wilmington, DE | 8 | 8 | 8 | 9 | 15 | 19 | 21 | 19. | 15 | 12 | 12 | 10 |

During January, MM is most commonly found along the Pacific Coast, where the strong westerlies previously described often carry ashore air which has resided over the mild Pacific.

Frequency exceeds 20 percent along almost the entire coast, from southern Alaska through San Diego. The highest frequencies, above 30 percent, extend from Vancouver Island to Astoria, Oreg. Frequencies drop inland, and then decline significantly across the Divide. In the eastern part of North America, the frequency pattern is ill-defined, with a slight north-south gradient. Frequency is between 10 and 15 percent across much of the southeastern US, Great Lakes region, and the Atlantic Coast, and less than 10 percent elsewhere. Over much of northern Canada, MM air is virtually non-existent in January.

Through the remainder of winter, into springtime, MM air remains relatively uncommon across the eastern half of North America, with April frequencies similar to those of January. Near the Pacific Coast, the frequency drops significantly after March, and by April only from Vancouver Island to San Diego is the frequency above 10 percent; only at two stations (Quillayute and Seattle, Wash.) does it exceed 20 percent.

The MM pattern undergoes another shift between June and July. The 10 to 20 percent zone encompasses the entire Pacific Coast, from Alaska to California. Peak MM frequency now shifts to the eastern third of the US and the Atlantic Provinces, with most stations between 20 and 32 percent. Many of these days are modified MT days, that is, MT days on which excessive cloud cover lowers temperatures significantly. Over the Appalachians a modest maximum is located; Sable Island, NS, out in the Atlantic, is the only station with MM on greater than half of all July days. Away from this region, a broad area of 10 to 20 percent frequency covers most of central Canada, from Yellowknife, NT, to Churchill, MB, to Labrador. Minima of MM are found over the Great Basin and the Canadian Archipelago; in both regions virtually no MM is found.

With the oceans near their warmest levels of the year, October MM frequencies are highest along both coasts. Frequency over much of the eastern half of North America has dropped, although most places south of central Quebec and Ontario experience MM at least one day in ten. Along the Pacific Coast, MM becomes more frequent once again, with frequencies above 20 percent between San Diego and Vancouver. Frequencies in the Great Basin and Rockies are still very low, with most areas less than 8 percent.

Conditions with the MM air mass in January show a pattern similar to MP, only several degrees warmer (Table 18). The warmest MM locations are found over the Florida peninsula, with temperatures between 16° and 22°. Along coastal California and Oregon, over much of the low desert, and southeastern US, temperatures range from 10° to 14°. Temperatures are around 5° across the Mid-Atlantic, Central Plains, northwestern US, and coastal British Columbia. The 0° isotherm runs from Anchorage down near the coast to Kamloops, BC, and then inland through Bismarck, N.Dak. to Quebec, PQ. Temperatures reach −5° to −8° across the northern Prairie Provinces and central Alaska before MM air is no longer identified. As with MP, the dew point depression is only 2° to 40 at most stations.

TABLE 18

| | January | | | April | | | July | | | October | | |
|---|---|---|---|---|---|---|---|---|---|---|---|---|
| STATION | T | Td | cc | T | Td | cc | T | Td | cc | T | Td | cc |
| Anchorage, AK | 0 | −4 | 9 | 9 | 0 | 8 | 17 | 11 | 9 | 9 | 3 | 9 |
| Baker Lake, NT | | N/A | | | N/A | | 16 | 10 | 8 | | N/A | |
| Calgary, AB | 0 | −6 | 8 | 9 | 1 | 8 | 19 | 10 | 8 | 9 | 2 | 8 |
| Dallas-Ft. Worth, TX | 11 | 7 | 9 | 20 | 15 | 9 | 28 | 21 | 8 | 21 | 17 | 8 |
| Miami, FL | 22 | 17 | 8 | 24 | 19 | 8 | 26 | 23 | 8 | 25 | 22 | 8 |
| Minn.-St. Paul, MN | 1 | −3 | 9 | 11 | 6 | 9 | 24 | 18. | 8 | 14 | 10 | 9 |
| Phoenix, AZ | 13 | 8 | 9 | | N/A | | | N/A | | 22 | 15 | 9 |
| St. Johns, NF | 2 | 1 | 10 | 6 | 4 | 9 | 18 | 14 | 8 | 11 | 9 | 8 |
| Seattle, WA | 8 | 5 | 10 | 12 | 7 | 9 | 19 | 13 | 9 | 15 | 11 | 9 |
| Wilmington, DE | 7 | 4 | 9 | 15 | 10 | 9 | 25 | 20 | 9 | 18 | 14 | 9 |

By April, MM days feature the usual north-south temperature gradient with little oceanic influence. Temperatures range from around 22° across southern Texas and southern Florida to around 14° to 16° from northern California to the Mid-Atlantic, and around 11° at the US-Canadian border. Temperatures do not fall much below 5° in central Canada and Alaska before MM air becomes quite rare. Dew points average 4° to 7° below the afternoon temperature at most locations, except the Great Basin and Rockies, where the dew point depression at some locations exceeds 10°.

As with other air masses, the continent-wide temperature gradient for MM reaches its minimum in July. The warmest stations, from 26° to 28°, are located south of a line from Las Vegas to Cape Hatteras. N.C. Much. of the rest of the US is between 22° and 26° the Rockies and all of southern Canada and the US Northwest are between 20° and 22°. Temperatures are near 18° to 20° well into the Northwest Territories until the air mass becomes rarely identified. Dew points range from 16° to 22° across the eastern US and southeastern Canada, with values from 12° to 16° elsewhere.

In October, the MM air mass's warmest temperatures are once again located over southern Texas and Florida (22° to 25°). Values decrease to 160 to 180 from central California to the MidAtlantic, and 101 to 120 along the US-Canadian border. Northward of the 6° isotherm, through central Canada and Alaska, MM air is rarely identified. Dew points are 4° to 6° below the temperature, except in the Rockies and Great Basin, where they range up to 10° below.

Over much of the continent east of the Continental Divide, the Moist Tropical (MT) air mass battles DP for control. It is not surprising, therefore, that their frequency patterns are largely diametrical. Like that of DP, MT's pattern of occurrence features a very strong seasonality, as it is quite capable of traveling significant distances from its source region. However, MT is an extremely rare occurrence across much of the Rocky Mountains, Great Basin, and the northern interior of the continent (Table 19).

The remainder of winter, into spring, brings a see-saw of the MT pattern; frequency falls along the Pacific Coast and rises in the eastern half of the continent. In the Pacific, April frequency exceeds 2 percent only from San Francisco to San Diego, with no values higher than 11 percent. Frequency is virtually zero across all of interior western North America. A sharp increase occurs east of the 100th parallel (100° W longitude); the 2 percent contour parallels the US-Canadian border east of this line. Frequency increases to near 10 percent in the MidAtlantic, Ohio River Valley, and southern Great Plains away from the Gulf. Values over 30 percent are limited to the Gulf Coast, with a maximum of near 60 percent in Brownsville, Tex. and Key West, Fla.

The see-saw continues, and by July much of eastern North America sees its maximum MT frequency. Values exceed 10 percent east of the 100th parallel and south of a line from Winnipeg, MB to Quebec, PQ. Frequencies increase with proximity to the Gulf Coast: values are near 30 percent in New York City and Chicago, 50 percent in Memphis and Wilmington, N.C., and above 70 percent over the south Texas coast and southern Florida. A slight suppression of MT is noted across the Appalachian Mountains. much of this is compensated for by the increase in MM noted above.

TABLE 19

| STATION | Jan | Feb | Mar | Apr | May | Jun | Jul | Aug | Sep | Oct | Nov | Dec |
| --- | --- | --- | --- | --- | --- | --- | --- | --- | --- | --- | --- | --- |
| Anchorage, AK | | | | | | | | | | | | T |
| Baker Lake, NT | | | | | | | | | | | | |
| Calgary, AB | — | T | — | T | — | T | T | — | — | — | T | T |
| Dallas-Ft. Worth, TX | 9 | 10 | 19 | 29 | 41 | 51 | 43 | 44 | 43 | 23 | 16 | 9 |
| Miami, FL | 49 | 47 | 51 | 48 | 61 | 72 | 82 | 82 | 77 | 64 | 57 | 54 |
| Minn.-St. Paul, MN | T | T | 3 | 5 | 10 | 18 | 25 | 20 | 11 | 5 | 1 | T |
| Phoenix, AZ | 8, | 6 | 3 | 1 | 3 | 3 | 37 | 36 | 15 | 6 | 3 | 4 |
| St. Johns, NF | 1 | 1 | 1 | 1 | 2 | 4 | 9 | 8 | 3 | 3 | 4 | 2 |
| Seattle, WA | 6 | 12 | 5 | 2 | 2 | 1 | T | — | T | 1 | 1 | 2 |
| Wilmington, DE | 3 | 3 | 6 | 7 | 16 | 28 | 34 | 32 | 22 | 12 | 7 | 3 |

MT is least influential in January. Frequency is only high (up to 50 percent) over extreme southern Florida; a very sharp gradient is noted along the Florida peninsula; by the Florida panhandle, frequency is under 20 percent. The 10 percent contour runs from Del Rio, Tex. to Jackson, Miss., and Wilmington, N.C. Northward of a line from Vancouver to Las Vegas to El Paso to Cleveland, Mont. air occurs on fewer than one in 50 January days.

Along with the other seasonal pattern reversals already mentioned, the Pacific Coast is the only area of the continent with a non-summer maximum. In many locations, MT air is at its maximum in January or February and is not even identified in the summer (e.g., Seattle, Table 19). Warm, tropical infusions, termed the "Pineapple Express" because of their trajectory from Hawaii, while uncommon, are responsible for this pattern; MT frequencies range from 5 to 20 percent in the region extending from Vancouver to Seattle.

The most striking MT seasonal oscillation is in the southwestern US, where the monsoon begins in early July. This phenomenon is most pronounced in southern Arizona. As can be seen in Phoenix (Table 13), the frequency of MT increases dramatically in July and August; July frequency is more than 10 times the June frequency.

By September the monsoon has ended; by October, very little MT air is found anywhere in the western half of North America. Only from Los Angeles to San Diego does frequency exceed 10 percent. In the East, MT has retreated as well; frequency is only greater than 10 percent south of a line from Wilmington, Del., to Kansas City, Mo., to Abilene, Tex. Values increase linearly approaching the Gulf Coast, with maxima of 50 to 65 percent again found over southern Florida and Texas.

Typically overcast during the cold season, and partly cloudy during the warmer months, the MT air mass is responsible for the highest dew points observed at any given location year-round. Temperatures are generally warmer than average, especially during the winter months, where it is usually responsible for a given location's warmest winter temperatures. Table 20 displays the mean conditions of the MT air mass for ten locations.

TABLE 20

| STATION | January | | | April | | | July | | | October | | |
|---|---|---|---|---|---|---|---|---|---|---|---|---|
| | T | Td | cc | T | Td | cc | T | Td | cc | T | Td | cc |
| Anchorage, AK | | N/A | | | N/A | | | N/A | | | N/A | |
| Baker Lake, NT | | N/A | | | N/A | | | N/A | | | N/A | |
| Calgary, AB | | N/A | | | N/A | | | N/A | | | N/A | |
| Dallas-Ft. Worth, TX | 20 | 13 | 8 | 27 | 18 | 7 | 34 | 21 | 4 | 29 | 18 | 68 |
| Miami, FL | 25 | 18 | 5 | 28 | 19 | 5 | 30 | 23 | 5 | 29 | 21 | 5 |
| Minn.-St. Paul, MN | | N/A | | 21 | 11 | 9 | 30 | 20 | 6 | 22 | 15 | 7 |
| Phoenix, AZ | 17 | 8 | 8 | | N/A | | 38 | 16 | 6 | 29 | 14 | 6 |
| St. Johns, NF | | N/A | | | N/A | | 23 | 17 | 7 | 1.6 | 14 | 9 |
| Seattle, WA | 12 | 6 | 9 | 20 | 9 | 8 | | N/A | | | N/A | |
| Wilmington, DE | 14 | 9 | 9 | 22 | 13 | 8 | 31 | 21 | 6 | 23 | 17 | 7 |

In January, afternoon temperatures with MT exceed 20° over much of the Gulf Coast, as high as 25° at Miami. Dew points range between 13° and 18°. Moving north from the Gulf Coast, the temperature falls rapidly, to around 12°, with 8° dew points, along a line from Kansas City to New York City. Northward of this line MT occurrence becomes quite rare. Along the Pacific Coast, temperatures range from 11° in Vancouver to 19° in San Diego, with dew points between 7° and 12.

The thermal gradient observed in January is much decreased by April, as MT infusions across the eastern half of North America become more common. Afternoon temperatures range from a maximum of 28° across southern Texas and Florida, to 24° from Raleigh N.C. to Topeka, Kans., to near 20° across the northern reachs of significant MT penetration, from Minneapolis-St. Paul to Albany, N.Y. Dew points are between 120 and 17° over much of the East, with highest values (up to 20°) along the immediate Gulf Coast. Along the Pacific Coast, temperatures and dew points are nearly homogeneous, with values of around 21° and 11°, respectively.

July MT conditions are quite similar throughout most of eastern North America. Temperatures are between 30° and 34° for nearly all of the Plains states, Mid-Atlantic, and southeastern US. Values of 27° or higher are found at the rest of the eastern locales, except for the Atlantic Provinces and eastern Quebec, where afternoon temperatures are only in the midtwenties. Dew points are above 17° everywhere MT is identified. Values are above 20° south of a line from Minneapolis-St. Paul to Wilmington, Del., with the highest dew points (23°) covering a large area of the southeastern US. Over the western half of the continent, MT is largely limited to areas affected by the monsoon system. Here, MT temperatures are between 34° and 38°, with dew points between 13° and 18°.

With warmer temperatures in the Atlantic Ocean and Gulf of Mexico, MT in October verages slightly warmer and somewhat more humid than MT in April. Temperatures across the eastern half of the continent range from 23° in Philadelphia to Omaha to 29° along the Gulf Coast. Dew points at most locations are between 14° and 17°, with Gulf Coast stations, as usual, much higher (up to 21°). Over those areas of the southwestern US where MT is identified, temperatures range from 25° to 29°, with dew points around 14°.

Unlike the air masses themselves, the transitional (TR) situation arises as the replacement of one air mass with another over the course of a day. There is a much smaller amplitude of transition frequency values: they almost never exceed 20 percent at any location and are infrequently below 5 percent. Seasonal patterns are therefore harder to discern, with many stations showing variations of under 8 percent over the course of the year (Table 21).

TABLE 21

| STATION | Jan | Feb | Mar | Apr | May | Jun | Jul | Aug | Sep | Oct | Nov | Dec |
|---|---|---|---|---|---|---|---|---|---|---|---|---|
| Anchorage, AK | 7 | 10 | 9 | 9 | 8 | 6 | 4 | 5 | 9 | 9 | 11 | 10 |
| Baker Lake, NT | 11 | 12 | 15 | 23 | 18 | 9 | 10 | 9 | 7 | 13 | 13 | 10 |
| Calgary, AB | 12 | 10 | 7 | 9 | 9 | 12 | 12 | 9 | 8 | 11 | 9 | 13 |
| Dallas-Ft. Worth, TX | 9 | 8 | 11 | 11 | 7 | 3 | 2 | 1 | 3 | 7 | 8 | 8 |
| Miami, FL | 9 | 10 | 9 | 5 | 2 | 2 | 1 | 1 | 2 | 2 | 6 | 7 |
| Minn.-St. Paul, MN | 16 | 13 | 11 | 13 | 11 | 13 | 8 | 9 | 14 | 14 | 10 | 14 |
| Phoenix, AZ | 8 | 9 | 15 | 20 | 13 | 14 | 11 | 5 | 3 | 5 | 7 | 6 |
| St. Johns, NF | 20 | 17 | 15 | 8 | 10 | 12 | 10 | 11 | 15 | 16 | 16 | 17 |
| Seattle, WA | 8 | 5 | 5 | 6 | 7 | 7 | 6 | 6 | 9 | 10 | 12 | 9 |
| Wilmington, DE | 11 | 13 | 13 | 14 | 10 | 9 | 7 | 6 | 10 | 9 | 12 | 12 |

In January, with the largest difference among air masses and the fastest westerlies at any time of year, TR frequency is near or at its maximum over many areas of the continent. East of the Divide, frequency is above 10 percent at nearly all locations except the Canadian Archipelago, some Appalachian stations, and the south central US. A broad maximum of 15 to 22 percent extends from Regina, SK to St. Johns, NF, with a bulge south over Minnesota, Wisconsin, and the Dakotas. Transition frequency is lower in the Rockies, and points west, with most values between 7 and 12 percent.

Many stations do not show a significant TR frequency change from January to April, with values within 2 to 4 percent of their January levels. Several changes are apparent, however. The broad maximum mentioned above no longer appears, with the values across southeastern Canada similar to much of the rest of the continent (8 to 15 percent). Frequency also declines along the Gulf Coast (as low as 5 percent), where, by April, frontal activity is markedly less common. Frequency does increase over much of the southwestern US, as well as northern Canada, especially in the Hudson Bay region, as the ice begins to melt. Values are as high as 15 to 23 percent in these locations.

With the westerlies at their weakest, and air mass differential at a minimum, it is not surprising that TR frequency reaches its nadir in July. Frequency is under 5 percent over almost all of the southeastern US, as well as much of the Pacific Coast and Alaska. Values are below 1 percent in Miami and Key West. Much of the remainder of the continent is between 5 and 10 percent, except for a belt of 10 to 15 percent extending southeastward from the western Northwest Territories to Labrador. The only stations not at or near their annual TR minimum in July are those affected by the southwestern monsoon.

October brings an increase of mid-latitude cyclone activity over much of North America, although air mass contrast is not as strong as it is in April. Hence, while values increase from their July values, they are still lower than most other times of year for much of North America. TR frequency ranges from 5 to 10 percent across the Rockies and southeastern US, with a few stations below 5 percent. Values from 10 to 15 percent are found in the remainder of the continent, with almost no locations above 16 percent.

Now that the implementation of SSC2 has been described, the first two practical applications for it will now be set forth. First, the half-century long trends in air mass frequency and character are reanalyzed for all of North America. Second, an examination the variability of air mass frequency and character in relation to weather cycles is proposed, with the goal of better understanding the effects of these global weather pattern shifts upon local North American climate.

With the SSC2 now available to cover a wider scope both spatially and temporally, the secular trends present in the air mass calendars will first be reexamined. All trends will initially be analyzed on a seasonal level, with the seasons defined meteorologically:

winter (December, January, February), spring (March, April, May), summer (June, July, August), and autumn (September, October, November).

Frequency trends of the six air masses and transition will be assessed for all four seasons. In addition, for the six air masses, for the summer and winter seasons, trends in four characteristics will also be analyzed: mean 16 h EST ("afternoon") temperature, mean 16 h EST ("afternoon") dew point, mean 04 h EST ("morning") temperature, and mean daily cloudiness. Character analysis will not be performed on infrequently-occurring air masses (less than 5 percent of days within a given season).

With a total of 76 parameters (48 character, 28 frequency) analyzed for each of 328 stations, there will be nearly 25,000 possible tests performed. Hence, initial analyses can not be done in depth; at first, only a test of whether or not there is a significant temporal trend will be performed.

For the four air mass character parameters, a simple linear regression model shall be fit:

$$\hat{y} = b_0 + b_1 x, \tag{6}$$

where $\hat{y}$ is the response variable (the meteorological parameter), $b_0$ is the y-intercept of the straight line fitted, $b_1$ is the slope of the fitted line, and x is the dependent variable (year). The model will be fit using the method of least squares, which chooses the values of $b_0$ and $b_1$ which minimize the sum of squared errors of prediction, that is, $\min(\Sigma(y-\hat{y})^2)$. It should be noted that this model assumes the variables are normally distributed. For both temperature and dew point, the assumption of normality is nearly always valid. For the cloud cover values, it is hoped the daily and monthly averaging will produce a normal distribution; tests will be performed on several stations' data to assure a significant violation of normality is avoided. This model also assumes that the error terms are independent.

Once the trendline is fit, a test is then performed to discern whether $b_1$ is significantly different from zero, implying there is a slope to the line, or a linear trend in the data. For this, the test statistic t* shall be used:

$$t^* = \frac{b_1}{s\{b_1\}} \tag{7}$$

where $s\{b_1\}$ is the standard deviation of $b_1$. If t* exceeds a certain threshold, the slope is considered to be non-zero.

For frequency of air masses, similar tests will be performed. However, unlike air mass character, a unique problem exists among the air mass frequencies: the unit-sum constraint, that is, all of the frequencies must add up to a constant sum (1, in the case of the frequencies used here). Given that the dominance of two or three air masses at any given location for any given time of year is typical, this problem is exacerbated by the likelihood that a statistically-significant increase in one air mass will be accompanied by a statistically-significant decrease in another air mass. To remedy this problem, several methods are available, most involving creation of a ratio for each parameter, that is, dividing each air mass frequency by another variable, e.g. the geometric mean of the frequencies. Several methods will be tested, and the most appropriate method of data transformation chosen.

Once these initial evaluations are done, the statistical significance of these tests will be assessed graphically, by plotting all significant values for each parameter, for each season, on a map of North America. Results which are considered particularly noteworthy and/or are widespread over the continent will be followed up with more detailed statistical tests. These further tests will attempt to address the following:

Is there any higher order pattern to the data? A quadratic ($y = b_0 + b_1 x + b_2 x^2$) function, or other higher order functions, will be fit to the data to see if any non-linear trends appear in the data.

Is there a step function to the data? That is, is there a break point after which the frequency or character of an air mass increases or decreases significantly, but with no trend apparent before or after this point?

How spatially cohesive are the significant results? Do the same results appear at neighboring stations?

Are the patterns identifiable at a monthly level in addition to the seasonal level? For those areas which have significant trends, analysis will be performed to discern the start and end months of the trends.

Because of the large number of tests involved in this study, much caution shall be used in the interpretation of the statistical significance of these results.

The second part of the proposed work involves the assessment of air mass variability with weather cycles. For this, frequency and character are again considered separately.

Four different weather cycles will be tested: Pacific North American (PNA), North Atlantic Oscillation (NAO), Southern Oscillation Index (SOI—El Niño and Quasi—Biennial Oscillation and Solar Flux (QBO-SF).

While all of these cycles have numeric indices, they are usually analyzed by categorizing the value into one of several categories; see Table 5.2 for a list of the categories used in this research. For each of the first three patterns, there is a general "positive" and "negative" phase, and situations in which neither phase is identified ("neutral"). For the QBO-SF, however, the situation is more complicated. The QBO segment only contains a "westerly" or "easterly" phase, based on wind flow; seasons in which the wind flow reverses are discarded here, as in other research. The SF segment does not have "phases" similar to the other indices; for this initial segment, two groups are created, "high" solar activity, with solar flux above the median, and "low" solar activity, with solar flux below the median.

The first test will be a chi-square ($\chi^2$) test for independence performed on frequency values, (Ott 1993), that is, is air mass frequency at a particular time of year at a given station independent of the weather cycle phase? The $\chi^2$ test is designed as follows:

|  | Positive | Neither | Negative | Air mass Sum |
|---|---|---|---|---|
| DM | $o_{11}$ | $o_{21}$ | $o_{31}$ | $n_1 =$ |
|  | $e_{11} = m_1 n_1/N$ | $e_{21} = m_2 n_1/N$ | $e_{31} = m_3 n_1/N$ | $o_{11} + o_{21} + o_{31}$ |
| DP | $o_{12}$ | $o_{22}$ | $o_{32}$ | $n_2 =$ |
|  | $e_{12} = m_1 n_2/N$ | $e_{22} = m_2 n_2/N$ | $e_{32} = m_3 n_2/N$ | $o_{12} + o_{22} + o_{32}$ |
| DT | $o_{13}$ | $o_{23}$ | $o_{33}$ | $n_3 =$ |
|  | $e_{13} = m_1 n_3/N$ | $e_{23} = m_2 n_3/N$ | $e_{33} = m_3 n_3/N$ | $o_{13} + o_{23} + o_{33}$ |
| MM | $o_{14}$ | $o_{24}$ | $o_{34}$ | $n_4 =$ |
|  | $e_{14} = m_1 n_4/N$ | $e_{24} = m_2 n_4/N$ | $e_{34} = m_3 n_4/N$ | $o_{14} + o_{24} + o_{34}$ |
| MP | $o_{15}$ | $o_{25}$ | $o_{35}$ | $n_5 =$ |
|  | $e_{15} = m_1 n_5/N$ | $e_{25} = m_2 n_5/N$ | $e_{35} = m_3 n_5/N$ | $o_{15} + o_{25} + o_{35}$ |
| MT | $o_{16}$ | $o_{26}$ | $o_{36}$ | $n_6 =$ |
|  | $e_{16} = m_1 n_6/N$ | $e_{26} = m_2 n_6/N$ | $e_{36} = m_3 n_6/N$ | $o_{16} + o_{26} + o_{36}$ |
| TR | $o_{17}$ | $o_{27}$ | $o_{37}$ | $n_7 =$ |
|  | $e_{17} = m_1 n_7/N$ | $e_{27} = m_2 n_7/N$ | $e_{37} = m_3 n_7/N$ | $o_{17} + o_{27} + o_{37}$ |
| Phase Sum | $m_1 = \Sigma o_{1i}$ | $m_2 = \Sigma o_{2i}$ | $m_3 = \Sigma o_{3i}$ | $N = m_1 + m_2 + m_3$ | where $o_{ij}$ is the total number of days classified as air mass j during seasons of phase i; m and n are the column and row totals, respectively; N is the grand total; and $e_{ij}$ is the expected number of days classified as air mass j during seasons of phase i, if air mass categories are independent of phase.

Independence is then tested for by the equation:

$$\chi^2 = \sum_{i,j} \frac{(o_{ij} - e_{ij})^2}{e_{ij}}.$$

The $\chi^2$ value is then compared against a table value; if the $\chi^2$ threshold is exceeded (at $\alpha=0.05$) it is assumed there is some dependency. Where there is a dependency, the next step is taken to discern which air mass or air masses are the dependent ones. For this, a simple linear regression model is fit, relating the frequency of the air mass to the value of the index. Those air masses which have statistically significant correlation between their frequency and index value are considered to be dependent. For the QBO-SF cycle, data will be segregated by QBO phase, and a regression performed between air mass frequency and solar flux for each phase.

For air mass character, an analysis of variance test will be used to discern whether the conditions are similar among different weather cycle phases. That is, does weather cycle phase have any impact upon a particular parameter, e.g., mean 16 h temperature of the MT air mass?

The analysis of variance test requires the calculation of two statistics:

$$s_w^2 = \frac{(n_1 - 1)s_1^2 + (n_2 - 1)s_2^2 + (n_3 - 1)s_3^2}{n_1 + n_2 + n_3 - 3},$$

where $n_i$ is the number of values in weather cycle i and $s_i$ is the standard deviation of these values for weather cycle phase i; and $S_B^2$, which is the sample variance of the three means. The ratio of these two variables can be used as a test statistic:

$$F = \frac{s_B^2}{s_w^2}.$$

If the three groups have identical means, then the two statistics should be nearly equal; with increasing F, the disparity between the groups is increased, and beyond a theoretical threshold, one can assume that the three categories do not have equal means. (Note: for the QBO-SL tests, the above formulas and text will be modified for four categories.)

As with the trend analysis, for statistically significant results which are geographically widespread, seasons will be subdivided into months, to more properly identify the periods of a year during which a given weather cycle phase is important.

Air mass calendars have been completed for all 328 stations. The mean values of 16 h EST temperature, 16 h EST dew point, 04 h EST temperature, and mean daily cloud cover are calculated for each air mass for each month and season. The number of occurrences of each air mass for each. month and season is summed; for all tests other than the $\chi^2$ tests, these numbers are converted to a seasonal or monthly frequency by the following formula:

$$F(x) = \frac{\text{number of days of } x \times 100}{\text{total number of classified air mass and transition days}},$$

where x is a particular air mass or transition, and F(x) is its frequency. Months with more than three days unavailable, and seasons with more than nine days unavailable are classified as missing for the month and/or season; their data are excluded from all analyses except the $\chi^2$ tests.

To investigate serial correlation, a mean-square successive difference test is performed on the mean character and frequency values. For the N values, taken in temporal order:

$$\eta = \frac{\sum_{i=1}^{N-1}(X_{i+1} - X_i)^2}{\sum (X_i - \overline{X})^2}, \text{ and } z^* = \frac{1 - \eta/2}{\sqrt{\frac{N-2}{(N-1)(N+1)}}}.$$

The value of z* will be compared with a normal table value at significance $\alpha=0.05$; if the threshold is exceeded, there is evidence of serial correlation. If this problem is common among the data sets, remedial measures, such as a transformation of the variables by:

$$Y_i = X_i - X_{i-1}$$

where Y is a transformed variable and X the original variable, may be undertaken.

The Pacific North American (PNA) and North Atlantic Oscillation (NAO) data have been obtained from the Climate Prediction Center website. These data are not based on the simple formulas listed above, but rather are calculated based on rotated principal component analysis. This method is based upon the PCA mentioned above, except that the eigenvectors are rotated to produce more physically-meaningful results (at the cost of losing some of the variance explained). For this data set, RCPA is applied to the monthly mean 70-kPa geopotential height anomalies for the period 1964–1994. The top ten patterns (rotations) for each calendar month are determined by examining all of the anomaly maps for the given month and the flanking months (that is, for April, the top ten patterns are discerned from the anomaly fields of March, April, and May). This method is considered superior to the traditional formulas as it considers the entire mid-atmospheric flow field, not just several selected locations.

Data for these two teleconnections are available since January 1950. The NAO is available all twelve months of the year, as it is the most dominant pattern in Northern Hemispheric circulation. The PNA is the third-most dominant pattern, unidentified in June and July; hence, no data are available for these months. As the patterns are already based on a three-month average for the particular-month, no seasonal averaging is performed on the data; for example, for summer 1990, the July 1990 value is used directly, since it already represents an average of June, July, and August 1990.

The Southern Oscillation Index (SOI) values have also been obtained from the Climate Prediction Center website. The SOI used here is based on the traditional definition of the difference between standardized monthly mean pressure at Tahiti and Darwin. This index is available since 1881. To obtain the seasonal averages, the SOI values of the three months within the season are averaged.

The solar flux data used in this research has been downloaded from the website of the Solar-Terrestrial Physics division of the National Geophysical Data Center; the observations are originally from two recording stations operated by the National Research Council of Canada: Ottawa, ON (1947–1991) and Penticton, BC (1991-present). The monthly values are averages of the daily local noon observations of the solar flux, the integrated solar emission at a wavelength of 10.7 cm. While the absolute accuracy is in question, the relative errors are believed to be less than 1%. Values are in solar flux units (1 sfu=$10^{-22}$ W m$^{-2}$ Hz$^{-1}$). Quiet sun, the theoretical minimum of solar activity in this wavelength, is near 64 sfu. Data are available since February 1947. As with the above parameters, seasonal averages are derived from the simple arithmetic mean of the three monthly values.

The QBO data have been synthesized from two Climate Prediction Center sources. Much of the record is directly taken from the mean monthly 5 kPa wind vector at Singapore. In 1996, however, a more thorough approach was developed, with the index representative of the mean wind across the entire equatorial belt. The Singapore values are available from 1954 to early 1996; the new index has been calculated back to 1979 and is kept current. In order to obtain a complete record, the correlation between the two indices was calculated (r=0.94), and the predictive equation was used to extend the Singapore data through the present day. As the QBO data are only used for their sign (to stratify easterly and westerly components), this merging is not considered to present any problems. For seasonal averages; if the QBO is entirely one direction all three months, it retains that direction; if it shifts, it is eliminated from consideration.

The work described within this proposal represents a significant advance in the field of synoptic weather typing. In terms of the number of stations, geographic extent, and period of record, the scope of this project exceeds that of virtually all other similar synoptic projects.

The methodology of the SSC2 has been completed, including significant procedural changes for air mass seed day selection, transfer, and criteria modification. The calendars for all 328 stationare completed and available in several formats. Summary statistics, including the means of frequency and character of each of the air masses throughout the year, have been completed and presented graphically (see Appendix). Tests performed on the new SSC2 calendars show them more spatially homogeneous than that the SSC1 by 6 to 8 percent. This increase in "match percentage," coupled with year-round availability, make the SSC2 a considerable improvement over the SSC1. SSC2 calendars will ultimately be made available for a wide range of applications, and will be included on a compilation of weather indices and statistics to be published by the National Climate Data Center (NCDC). SSC2 can be combined with known animation procedures to produce a real-time animation of the SSC air masses, as an invaluable tool for understanding and forecasting weather.

Figure 10:
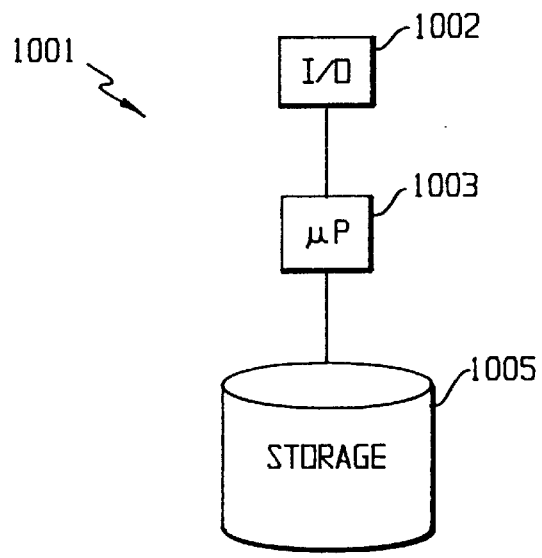
FIG. 10 is a block diagram showing hardware on which the preferred embodiment can be implemented.

The SSC2 can be implemented in Fortran or in any other similarly powerful programming language on any suitably powerful computing device. An illustrative example of such a device is shown in FIG. 10. The computing device 1001 includes a processing device, such as a microprocessor 1003, for performing the calculations. A storage device 1005, such as a hard drive, stores the data to be processed, the software for processing the data, and output data. An input/output (I/O) system 1007 performs input and output functions such as receiving the raw data, accepting commands from the user, providing a display of the output data, and making the output data available over a communication network such as a LAN, a WAN or the Internet. Suitable components of the I/O system can include a keyboard, a mouse, a monitor driven by a suitably powerful graphics card, a drive for a removable medium (e.g., a tape drive) and a network adapter card. The specifics of such components and of others that can be used are known in the art and will therefore not be detailed here. While it is contemplated that the system 1001 will run some variant of Unix. other operating systems can be used.

Sample code written in Fortran 90 is provided in the above-referenced computer program listing appendix. This code should be construed as illustrative rather than limiting.

Figure 11B:
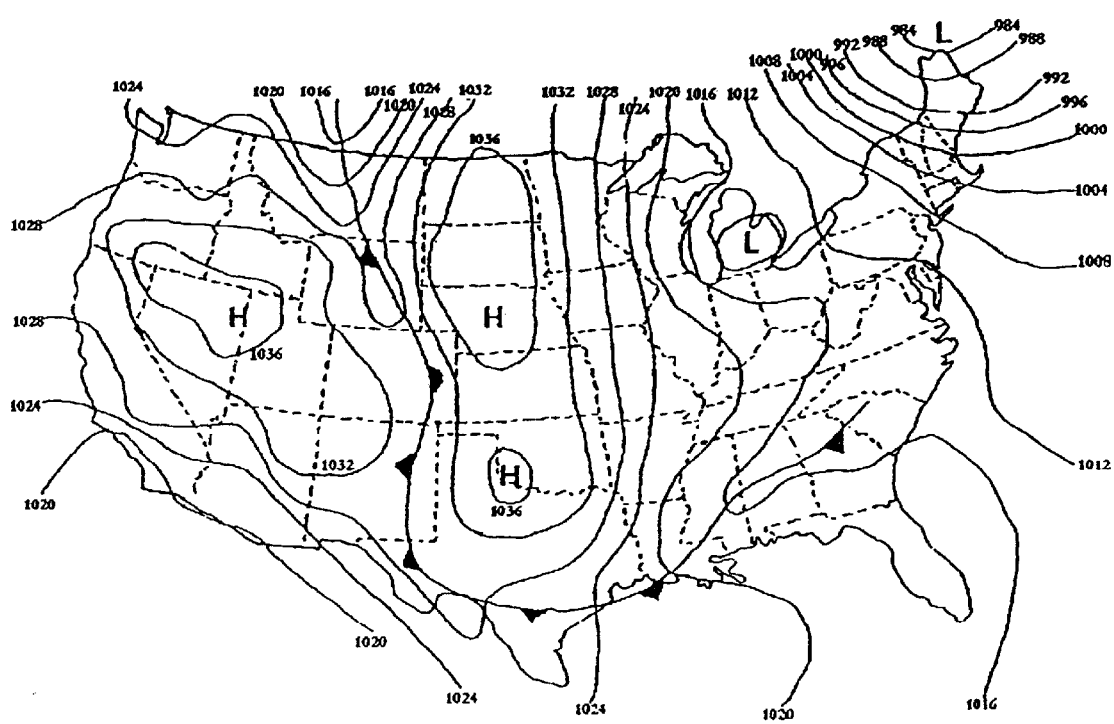
FIG. 11B shows a map of air mass types for the same day made according to the prior art.

The data processed as described above can be displayed as shown in FIG. 11A. The various types of air masses, transitional areas, and areas of no data are plotted on a map of the contiguous United States. The resulting map is both more accurate and more informative than a traditional synoptic map such as that of FIG. 11B. Both maps are based on archived data for Jan. 18, 1977.

While a preferred embodiment of the present invention has been set forth above in detail, those skilled in the art who have reviewed the present disclosure will readily appreciate that other embodiments can be realized within the scope of the invention. For example, the present invention is not limited in utility to the specific geographical locations, time periods, or uses disclosed above. Also, any suitable programming language on any suitable platform can be used. Therefore, the present invention should be construed as limited only by the appended claims.

We claim:

1. A method of categorizing air masses at a location from raw meteorological data taken at the cation on a plurality of days extending over at least a year, the method comprising:

(a) receiving the raw meteorological data into a computing device; and
(b) in the computing device:
  (i) selecting a plurality of seed days from plurality of days in accordance with the raw meteorological data, the seed days representing a typical meteorological character of each of the air masses at the location, the seed days being selected at least during a coldest period of the year at the location, a warmest period of the year at the location, and two intermediate periods between the coldest period and the warmest period;
  (ii) from the plurality of seed days, developing a classification technique for calculating a discrepancy between the raw meteorological data for each of the plurality of days and the typical meteorological character of each of the air masses; and
  (iii) using the classification technique to categorize each of the plurality of days.

2. The method of claim 1, wherein:
step (b)(i) comprises generating, from the plurality of seed days and the raw meteorological data, a plurality of artificial seed days representing the typical meteorological character for days other than the seed days; and
step (b)(ii) comprises developing the classification technique from the plurality of seed days and the plurality of artificial seed days.

3. The method of claim 2, wherein:
step (b)(i) further comprises selecting a plurality of transitional seed days representing transitions between various types of air masses; and
step (b)(ii) comprises developing the classification technique from the plurality of seed days, the plurality of artificial seed days, and the plurality of transitional seed days.

4. The method of claim 1, wherein:
step (b)(i) comprises selecting a plurality of transitional seed days representing transitions between various types of air masses; and
step (b)(ii) comprises developing the classification technique from the plurality of,seed days and the plurality of transitional seed days.

5. The method of claim 1, wherein step (b) further comprises:
  (iv) selecting a second location adjacent to the location of steps (b)(i) through (b)(iii);
  (v) transferring the seed days to the second location;
  (vi) comparing the raw meterological data for the transferred seed days between the location and the second location to determine whether the seed days meet a criterion to be retained at the second location; and
  (vii) retaining, at the second location, the seed day which are determined in step (b)(vi) to meet the criterion.

6. A system for categorizing air masses at a location from raw meteorological data taken at the location on a plurality of days extending over at least a year, the system comprising:

input means for receiving the raw meteorological data;
storage means for storing the raw meteorological data; and
processing means for:
  (i) selecting a plurality of seed days from plurality of days in accordance with the raw meteorological data, the seed days representing a typical meteorological character of each of the air masses at the location, the seed days being selected at least during a coldest period of the year at the location, a warmest period of the year at the location, and two intermediate periods between the coldest period and the warmest period;
  (ii) from the plurality of seed days, developing a classification technique for calculating a discrepancy between the raw meteorological data for each of the plurality of days and the typical meteorological character of each of the air masses; and
  (iii) using the classification technique to categorize each of the plurality of days.

7. The system of claim 6, wherein:
the processing means performs step (i) generating, from the plurality of seed days and the raw meteorological data, a plurality of artificial seed days representing the typical meteorological character for days other than the seed days; and
the processing means performs step (ii) by developing the classification technique from the plurality of seed days and the plurality of artificial seed days.

8. The system of claim 7, wherein:
the processing means performs step (i) by selecting a plurality of transitional seed days representing transitions between various types of air masses; and
the processing means performs step (ii) by developing the classification technique from the plurality of seed days, the plurality of artificial seed days, and the plurality of transitional seed days.

9. The system of claim 6, wherein:
the processing means performs step (i) by selecting a plurality of transitional seed days representing transitions between various types of air masses; and
the processing means performs step (ii) by developing the classification technique from the plurality of seed days and the plurality of transitional seed days.

10. The system of claim 6, wherein the processing means comprises means for:
  (iv) selecting a second location adjacent to the location of steps (i) through (iii);
  (v) transferring the seed days to the second location;
  (vi) comparing the raw meterological data for the transferred seed days between the location and the second location to determine whether the seed days meet a criterion to be retained at the second location; and
  (vii) retaining, at the second location, the seed day which are determined in step (vi) to meet the criterion.

* * * * *